US012559377B2

(12) United States Patent　　　　(10) Patent No.:　US 12,559,377 B2
　　　Sartipi et al.　　　　　　　　　　(45) Date of Patent:　Feb. 24, 2026

(54) METHOD OF SYNTHESIZING A MOLECULAR SIEVE OF MWW FRAMEWORK TYPE

(71) Applicant: ExxonMobil Chemical Patents Inc., Baytown, TX (US)

(72) Inventors: Sina Sartipi, Brussels (BE); Marc H. Anthonis, Vlaams Brabant (BE); Aaron W. Peters, New Hope, PA (US); Mariame Akouche, Montgomery (FR); Scott J. Weigel, Allentown, PA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 511 days.

(21) Appl. No.: 18/004,161

(22) PCT Filed: Jun. 28, 2021

(86) PCT No.: PCT/US2021/039376
　　§ 371 (c)(1),
　　(2) Date: Jan. 3, 2023

(87) PCT Pub. No.: WO2022/015491
　　PCT Pub. Date: Jan. 20, 2022

(65) Prior Publication Data
　　US 2023/0264965 A1　　Aug. 24, 2023

Related U.S. Application Data

(60) Provisional application No. 63/052,526, filed on Jul. 16, 2020.

(30) Foreign Application Priority Data

Oct. 28, 2020　(EP) ..................................... 20204269

(51) Int. Cl.
　　*C01B 39/48*　　　(2006.01)
　　*B01J 29/70*　　　(2006.01)

(52) U.S. Cl.
　　CPC ........... *C01B 39/48* (2013.01); *B01J 29/7038* (2013.01); *C01P 2002/72* (2013.01);
　　　　　　　(Continued)

(58) Field of Classification Search
　　CPC ... C01B 39/48; B01J 29/7038; C01P 2002/72; C01P 2002/86; C01P 2004/03; C01P 2006/11
　　See application file for complete search history.

(56) References Cited

U.S. PATENT DOCUMENTS 4,439,409 A　　3/1984　Puppe et al. ................... 423/328
4,826,667 A　　5/1989　Zones et al. ................... 423/277
　　　　　　　　(Continued)

FOREIGN PATENT DOCUMENTS

CN　　102452665 A　*　5/2012
EP　　0293032　　　7/1993　............. C01B 35/10
　　　　　　　(Continued)

OTHER PUBLICATIONS

Delitala, C. et al. (2009) "Synthesis of MCM-22 Zeolites of Different Si/Al Ratio and Their Structural, Morphological and Textural Characterisation," *Microporous and Mesoporous Materials*, v.118(1-3), pp. 1-10.
　　　　　　　(Continued)

*Primary Examiner* — Anthony J Zimmer
*Assistant Examiner* — Annette Phan
(74) *Attorney, Agent, or Firm* — Shook, Hardy & Bacon L.L.P.

(57)　　　　　ABSTRACT

Disclosed is a method of synthesizing a molecular sieve of MWW framework type, and molecular sieves so synthesized. The method comprises preparing a synthesis mixture
　　　　　　　(Continued)

Sample 11

2θ / ° for forming a molecular sieve of MWW framework type, said synthesis mixture comprising water, a silicon source, a source of a trivalent element X, a potassium cation source, a structure directing agent R, and a source of another alkali metal cation M.

24 Claims, 11 Drawing Sheets

(52) U.S. Cl.
CPC ...... *C01P 2002/86* (2013.01); *C01P 2004/03* (2013.01); *C01P 2006/11* (2013.01)

(56) References Cited

U.S. PATENT DOCUMENTS

| | | | | |
|---|---|---|---|---|
| 4,954,325 | A | | 9/1990 | Rubin et al. .................. 423/328 |
| 5,236,575 | A | | 8/1993 | Bennett et al. ................. 208/46 |
| 5,250,277 | A | | 10/1993 | Kresge et al. ............. 423/329.1 |
| 5,362,697 | A | * | 11/1994 | Fung ...................... C01B 33/38 |
| | | | | 502/77 |
| 5,453,554 | A | | 9/1995 | Cheng et al. ................. 585/467 |
| 5,827,491 | A | | 10/1998 | Emerson et al. .......... 423/328.2 |
| 6,077,498 | A | | 6/2000 | Diaz Cabanas et al. ..... 423/702 |
| 6,756,030 | B1 | | 6/2004 | Rohde et al. ................ 423/718 |
| 7,713,513 | B2 | | 5/2010 | Jan et al. ...................... 423/718 |
| 7,842,277 | B2 | | 11/2010 | Roth et al. ................... 423/718 |
| 7,959,599 | B2 | | 6/2011 | Matusch ......................... 604/68 |
| 8,110,176 | B2 | | 2/2012 | Roth et al. .................... 423/718 |
| 8,115,001 | B2 | | 2/2012 | Corma Canos et al. ....... 546/26 |
| 2011/0021856 | A1 | | 1/2011 | Lai et al. ...................... 585/467 |

FOREIGN PATENT DOCUMENTS

| | | | | |
|---|---|---|---|---|
| WO | WO1997/017290 | 5/1997 | ............ | C01B 33/38 |
| WO | WO2000/006493 | 2/2000 | ............ | C01B 37/04 |
| WO | WO2000/006494 | 2/2000 | ............ | C01B 37/08 |
| WO | WO2007/094937 | 8/2007 | ............ | B01J 37/10 |
| WO | WO2010/014406 | 2/2010 | ............ | C01B 39/46 |
| WO | WO2010/021795 | 2/2010 | ............ | C01B 39/46 |
| WO | WO2013/048636 | 4/2013 | ............ | C01B 39/48 |
| WO | WO2015/043114 | 4/2015 | ............ | B01J 20/18 |
| WO | WO2015/112293 | 7/2015 | ............ | C01B 39/48 |

OTHER PUBLICATIONS

Gao, S. et al. (2013) "Green Synthesis of SUZ-4 Zeolite Controllable in Morphology and SiO$_2$/Al$_2$O$_3$ Ratio," *Microporous and Mesoporous Materials*, v.174, pp. 108-116.

Lawton, S. L. et al. (1996) "Zeolite MCM-49: A Three-Dimensional MCM-22 Analogue Synthesized by in Situ Crystallization," *J. Phys. Chem.*, v.100(9), pp. 3788-3798.

Schwanke, et al. (2018) "Lamellar MWW-Type Zeolites: Toward Elegant Nanoporous Materials," *Appl. Sci.*, v.8(9), 1636, 15 pages.

Vuono, D. et al. (2004) "Synthesis and Characterization of MCM-22 and MCM-49 Zeolites," *Studies in Surface Science and Catalysis*, v.154(Part A), pp. 203-210.

* cited by examiner

Comparative Sample 1 (Ion-exchanged)

Comparative Sample 2a (Ion-exchanged)

Comparative Sample 2b (Ion-exchanged)

Comparative Sample 3 (Ion-exchanged)

Comparative Sample 3 (Ion-exchanged) (expanded view)

Sample 4 (Ion-exchanged)

Sample 5 (Ion-exchanged)

Sample 6 (Ion-exchanged)

Sample 7 (Ion-exchanged)

Sample 8 (Ion-exchanged)

Sample 9 (As-prepared)

Sample 10 (As-prepared)

Comparative Sample 11 (As-prepared)

METHOD OF SYNTHESIZING A MOLECULAR SIEVE OF MWW FRAMEWORK TYPE

CROSS REFERENCE TO RELATED APPLICATIONS

This application is a national stage filing of Patent Cooperation Treaty Application No. PCT/US2021/039376 filed Jun. 28, 2021, which claims priority to U.S. Ser. No. 63/052,526, filed Jul. 16, 2020, and EP 20204269.3 filed Oct. 28, 2020, wherein U.S. Ser. No. 63/052,526 and EP 20204269.3 are incorporated by reference.

FIELD OF THE INVENTION

This invention relates to a novel method of synthesizing a molecular sieve of MWW framework type, and molecular sieves so made.

BACKGROUND OF THE INVENTION

Molecular sieve materials, both natural and synthetic, have been demonstrated in the past to have catalytic properties for various types of hydrocarbon conversion reactions. Certain molecular sieves, such as zeolites, AlPOs, and mesoporous materials, are ordered, porous crystalline materials having a definite crystalline structure as determined by X-ray diffraction (XRD). Certain molecular sieves are ordered and produce specific identifiable XRD patterns, but are not strictly crystalline. Within certain molecular sieve materials there may be a large number of cavities, which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Such molecular sieves, both natural and synthetic, include a wide variety of positive ion-containing crystalline silicates. These silicates can be described as three-dimensional framework of $SiO_4$ tetrahedra and Periodic Table Group 13 element oxide (e.g. $AlO_4$) tetrahedra. The tetrahedra are typically corner-shared through oxygen atoms with the electrovalence of the tetrahedra containing the Group 13 element (e.g. aluminum, gallium or boron) being charged balanced by the inclusion of a cation, for example a proton, an alkali metal or an alkaline earth metal cation.

Typically, zeolite syntheses involve hydrothermal crystallization from a synthesis mixture comprising sources of all the elements present in the zeolite such as sources of silica but also of alumina etc., and in many cases a structure directing agent and/or a source of hydroxide or fluoride ions. Often, a synthesis mixture is obtained by treating a solution of aluminate and silicate with a compound which acts to cleave Si—O bonds, thus supplying growing crystals with Si and in some cases breaking up amorphous structures. Often, a hydroxide (OH⁻) source is used to assist in Si—O bond cleavage. Zeolite synthesis also commonly use structure directing agents (SDAs) to help promote the formation of crystals with the desired structure, especially organic molecule structure directing agents. Typically, zeolite crystals form around structure directing agents with the structure directing agent occupying pores in the zeolite once crystallization is complete. The "as-synthesized" zeolite will therefore contain the structure directing agent in its pores so that, following crystallization, the "as-synthesized" zeolite is usually subjected to a calcination step to remove the structure directing agent. For many catalytic applications, it is also desired to include metal cations such as metal cations of Groups 2 to 15 of the Periodic Table of the Elements within the molecular sieve structure. This is typically accomplished by ion exchange treatment. Formation of a desired zeolite structure can also be encouraged by adding seed crystals to the synthesis mixture. Seeding a molecular sieve synthesis mixture can have beneficial effects, including for example controlling product particle size, accelerating synthesis, improving selectivity for the desired structure type, and sometimes avoiding the need for an organic structure directing agent.

Molecular sieves such as zeolite crystal structures have found a wide range of applications within refinery processes and other processes for manipulating petroleum streams. Some zeolite applications are catalytic in nature, while other applications focus on the ability of zeolites to selectively adsorb molecules within a gas stream.

MWW-type molecular sieves are one class of zeolite useful in industrial processes, including for example in catalysis. Some members of the MWW zeolite family are active components of commercial catalysts for processes such as alkylation. MCM-22 has been employed successfully at a commercial scale in alkylation of benzene to produce cumene.

Zeolitic materials designated by the IZA-SC as being of the MWW topology are multi-layered materials which have two pore systems arising from the presence of both 10 and 12 membered rings. As such, MWW-type molecular sieves can be both microporous and mesoporous. As used herein, the term microporous is used to denote materials with pores having a diameter less than 1.5 nm and mesoporous is used to denote materials with pores having a diameter from 1.5 nm to 50 nm. Based on their 10-ring internal pore system, MWW framework type zeolites are considered to be intermediate pore size zeolites, which generally have a pore size from about 5 Å to less than about 7 Å. However, the 12-ring surface pockets, which do not communicate with the 10-ring internal pore system, can impart some properties more similar to large pore zeolite alkylation catalysts, such as mordenite.

Molecular sieves having a MWW framework structure are commonly referred to as a "MWW family molecular sieve material". As used herein, the term "MWW family molecular sieve material" includes one or more of:

(i) molecular sieves made from a common first degree crystalline building block unit cell, in which the unit cell has the MWW framework topology. (A unit cell is a spatial arrangement of atoms which if tiled in three-dimensional space describes the crystal structure. Such crystal structures are discussed in the "Atlas of Zeolite Framework Types", Fifth edition, 2001, the entire content of which is incorporated as reference);

(ii) molecular sieves made from a common second degree building block, being a 2-dimensional tiling of such MWW framework topology unit cells, forming a monolayer of one unit cell thickness, preferably one c-unit cell thickness;

(iii) molecular sieves made from common second degree building blocks, being layers of one or more than one unit cell thickness, wherein the layer of more than one unit cell thickness is made from stacking, packing, or binding at least two monolayers of one unit cell thickness. The stacking of such second degree building blocks can be in a regular fashion, an irregular fashion, a random fashion, or any combination thereof; and (iv) molecular sieves made by any regular or random 2-dimensional or 3-dimensional combination of unit cells having the MWW framework topology.

The MWW family molecular sieve materials are characterized by having an XRD pattern including d-spacing maxima at 12.4±0.25, 3.57±0.07 and 3.42±0.07 Angstroms (either calcined or as-synthesized). The MWW family molecular sieve materials may also be characterized by having an XRD pattern including d-spacing maxima at 12.4±0.25, 6.9±0.15, 3.57±0.07 and 3.42±0.07 Angstroms (either calcined or as-synthesized). The XRD data used to characterize said molecular sieve are obtained by standard techniques using the K-alpha doublet of copper as the incident radiation and a diffractometer equipped with a scintillation counter and associated computer as the collection system. Materials that belong to the MWW family include, but not limited to, MCM-22 (described in U.S. Pat. No. 4,954,325); PSH-3 (described in U.S. Pat. No. 4,439, 409); SSZ-25 (described in U.S. Pat. No. 4,826,667); ERB-1 (described in European Patent No. 0293032); ITQ-1 (described in U.S. Pat. No. 6,077,498); ITQ-2 (described in International Patent Publication No. WO1997/017290); ITQ-30 (described in International Patent Publication No. WO2005/118476); MCM-36 (described in U.S. Pat. No. 5,250,277); MCM-49 (described in U.S. Pat. No. 5,236, 575); MCM-56 (described in U.S. Pat. Nos. 5,362,697, 5,827,491, and 5,453,554); EMM-10 (described in U.S. Pat. No. 8,110,176), EMM-10-P (described in U.S. Pat. No. 7,959,599), EMM-12 (described in International Patent Publication No. WO2010/021795), EMM-13 (described in International Patent Publication No. WO2010/014406), and an MCM-22 family material (described in U.S. Pat. No. 7,842,277). Also, UZM-8 (described in U.S. Pat. No. 6,756, 030); and UZM-8HS (described in U.S. Pat. No. 7,713,513). The entire contents of said patents and applications are incorporated herein by reference. WO2007/094937 discloses a method of manufacturing a molecular sieve of the MCM-22 family WO2015/112293 discloses a method for making molecular sieves having a MWW framework structure using precipitated aluminosilicates.

MWW-type zeolites have a lamellar three-dimensional structure, each two-dimensional layer being approximately 1-2 nm thick. Within the MWW family, many individually defined materials represent different stacking arrangements of separated lamellae. Various strategies that have been utilised to obtain different members of the MWW family are reviewed in "Lamellar MWW-Type Zeolites: Toward Elegant Nanoporous Materials", A. Schwanke et al., *Appl. Sci.* 2018, v.8, pg. 1636, the contents of which are incorporated herein by reference. For example, MCM-22 can form via the precursor (P)MCM-22 containing the structure directing agent (SDA) hexamethyleneimine (HMI) sandwiched between individual lamellae, with hydrogen bonds between the HMI molecules and silanol groups on the zeolite surface holding lamellae in place. Calcination removes the HMI molecules and condenses the silanol groups, thereby forming three-dimensional MCM-22. A three-dimensional analogue of MCM-22, named MCM-49, can be formed by direct crystallization from a gel mixture, again using HMI as the SDA, by increasing the relative proportion of alkali metal (sodium) in the composition. "Zeolite MCM-49: A Three-Dimensional MCM-22 Analogue Synthesized by in situ Crystallization", S. L. Lawton et al., *J. Phys. Chem.*, 1996, v.100, pp. 3788-3798, discloses synthesis and characterization of MCM-22, (P)MCM-22 and MCM-49. It is disclosed that (P)MCM-22 is synthesized when the reaction mixture has an organic template/inorganic cation (alkali metal) ratio of greater than 2.0, whereas MCM-49 forms when the mole ratio is less than 2.0. MCM-22 and MCM-49 were found to be structurally very similar, except that the unit cell c-parameter of MCM-49 is larger, suggesting increased distance between layers in the lamellar structure. Increasing the proportion of alkali metal in the reaction mixture led to increased aluminum incorporation in the zeolite framework. For MCM-49, crystallite framework $Si/Al_2$ ratios of 17-22 were reported with HMI as the SDA. MCM-22 zeolites with Si/Al ratios in the range 9-46 (corresponding to $Si/Al_2$ ratios of 18-92) are disclosed in "Synthesis of MCM-22 zeolites of different Si/Al ratio and their structural, morphological and textural characterisation", C. Delitala et al., *Microporous and Mesoporous Materials*, vv.118(1-3), 2009, pp. 1-10.

Preparations of MCM-22 from reaction mixtures using NaOH or KOH as mineralizing agents and HMI as the SDA are disclosed in "Synthesis and characterization of MCM-22 and MCM-49 zeolites", D. Vuono et al., *Studies in Surface Science and Catalysis*, v.154, 2004, pp. 203-210. In that study, MCM-49 zeolites were also reported, but only using NaOH as the mineralising agent (only (P)MCM-22 could be obtained using KOH).

MCM-56 is an MWW family zeolite with partial lamellae disorder, which forms as an intermediate of MCM-49 (see A. Schwanke et al.). Each layer in MCM-56 is porous and has a framework structure closely related to that of MCM-22 and other MCM-22 family members. MCM-56 is isolated by stopping the reaction used to form MCM-49 in the middle of the crystallization course. If crystallization is allowed to continue, the initially exfoliated, randomly packed MCM-56 sheets (with MCM-22 topology and one 25 Å thick unit cell) become gradually organized into a 3-dimensional framework ordered in the c-direction, which is formally the zeolite MCM-49. The formation of MCM-56 presents a unique challenge, especially on a large scale, because it is a transient product and may undergo further change during the manufacturing process. For example, while careful control of crystallization conditions can be manageable on a laboratory scale, determining the correct time to stop crystallization, and thus isolate a useful quantity of an intermediate zeolite can be problematic on a commercial scale. WO2013/048636 discloses a method for manufacturing high quality porous crystalline MCM-56 material.

MWW zeolites are characterized by high aluminum content. A high aluminum content is important for high activity in catalytic processes. Each aluminum centre on an accessible part of the zeolite provides an acidic site that may provide catalytic activity. Higher aluminum content makes the zeolite more acidic and thus provides higher activity. When aluminum centres are located in zeolite pores, the size and shape of the pore can influence selectivity and activity. For example, reactant molecules that can access the pores more easily may undergo catalytic reactions in preference to molecules that have a size and/or shape that inhibits access to pores. This can present advantages and limitations in zeolite catalysts. For example, where aluminum centres are incorporated at sites in relatively small pores, the resulting zeolite catalyst may offer high selectivity for reactions with small reactant molecules, but also relatively low activity (even with smaller molecules, for example because reactions are slowed by the time taken for reactant molecules to enter and exit pores). Such catalysts may not be effective in catalysis of reactions involving larger reactant molecules, such as aromatic molecules. In MWW-type zeolites, aluminum centres located in 12-ring surface pores offer potential catalytic sites accessible to relatively large molecules, while aluminum centres located in the 10-ring internal pore network may be accessible only to smaller molecules. The mixed 10-ring/12-ring structure of MWW zeolites can provide catalysts suitable for use with a relatively wide variety of reactant molecules, depending on where aluminum is incorporated into the zeolite framework.

There is a practical limit to how much aluminum content can be incorporated into MWW structures as a high alumina content in the zeolite is more likely to result in transformation into a different structure. Nevertheless, it is believed that it should be possible to prepare an MWW zeolite with a framework aluminum content greater than what has been achieved in practice to date. Lawton et al. discloses MCM-49 having a $Si/Al_2$ of 17. $Si/Al_2$ ratio can have an effect on zeolite topology, which had made it challenging to lower the $Si/Al_2$ ratio in MCM-56 zeolites. For example, simply increasing the Al content of the zeolite synthesis mixture can lead to formation of significant quantities of impurities, or even complete absence of MWW zeolite product. There remains a need for further MWW zeolites with lower $Si/Al_2$ ratio. However, it is challenging to identify a consistently repeatable synthetic route to increasing aluminum content, while also maintaining the MWW zeolite structure.

SUMMARY OF THE INVENTION

The invention provides a method of synthesizing a molecular sieve of MWW framework type, the method comprising preparing a synthesis mixture capable of forming a molecular sieve of MWW framework type, said synthesis mixture comprising water, a silicon source, a source of a trivalent element X, a potassium cation source, a structure directing agent R, optionally a source of another alkali metal cation M, optionally a source of a pentavalent element Z, optionally a source of hydroxide ions, and optionally seed crystals. The synthesis mixture has the following molar ratio composition: $Si:X_2$=8 to 18, $H_2O$:$Si$=5-100, $(M+K^+):Si$=0.1 to 0.5, $M:K^+$=0 to 10, $R:Si$=0.1 to 1. The method further comprises heating said synthesis mixture under crystallization conditions for a time sufficient to form crystals of said molecular sieve of MWW framework type, said crystallization conditions including a temperature of from 100° C. to 220° C., and recovering said crystals of the molecular sieve of MWW framework type from the synthesis mixture.

The presence of $K^+$ in the zeolite synthesis mixture has been found to aid formation of MWW-type molecular sieve with a low $Si/Al_2$ ratio and having physical properties intermediate that of previously known MCM-49 and MCM-56 zeolites. Increasing Al content of the zeolite framework is expected to increase catalyst activity of the zeolite. The MWW-type molecular sieve formed by the method of the invention appears to have a level of lamellar disorder intermediate that of MCM-49 and that of MCM-56, and a mesoporosity intermediate that of MCM-49 and that of MCM-56. In addition, it has surprisingly been found that the MWW-type molecular sieve formed by the method of the invention has a density higher than that of MCM-49 and MCM-56, while it would have been expected to have a density intermediate to that of MCM-49 and MCM-56. This increased density is especially advantageous as, in industrial processes, the higher density of the MWW-type molecular sieve formed by the method of the invention allows for a higher amount of zeolite material that can be packed into a catalyst bed. Accordingly, the MWW-type material produced according to the method of the invention may offer an improved combination of mesoporosity and density. It is believed that the presence of $K^+$ in the synthesis mixture helps to reduce the formation of impurities, including non-MWW crystalline materials (such as mordenite) and MWW materials with lower mesoporosity (such as MCM-49). Without wishing to be bound by theory, it is believed that the relatively large size of $K^+$ ions (as compared to $Na^+$ ions more commonly present in MWW-type molecular sieve synthesis mixtures) helps to increase lamellar separation during crystallization, thus encouraging formation of a material that, like MCM-56, has greater lamellar disorder and increased mesoporosity. It is believed that an increase in framework Al can also increase lamellar spacing, possibly due to disruption of the Si framework. Without wishing to be bound by theory, it is believed that the increased lamellar spacing facilitated by the presence of $K^+$ ions in the synthesis mixture helps to allow greater incorporation of Al with less formation of unwanted non-MWW material impurities (such as mordenite). Accordingly, it has surprisingly been found that $K^+$ can assist in production of MWW-type materials with high framework Al contents. Furthermore, it is believed that the method of the present invention provides a reliable, scalable route to an MWW-type zeolite having physical properties intermediate MCM-49 and MCM-56 zeolites, and which may help to avoid at least some of the difficulties that arise from the transient nature of MCM-56 during crystallization.

Preferably, the synthesis mixture comprises M. For example, $M:K^+$=1 to 10. Preferably M is sodium. It may be that the presence of M allows the inclusion of a larger amount of alkali metal in the synthesis mixture while avoiding high potassium concentrations.

The invention also provides a molecular sieve of MWW framework type obtainable by or made according to the synthesis method of the invention.

The invention further provides a catalyst comprising the molecular sieve of MWW framework type of the invention.

The invention further provides a hydrocarbon catalysis process comprising the step of contacting a hydrocarbon feedstock with a catalyst of the invention. In one embodiment the catalysis process is alkylation, such as aromatic alkylation.

It will of course be appreciated that features described in relation to one aspect of the present invention may be incorporated into other aspects of the present invention. For example, the method of the invention may incorporate any of the features described with reference to the apparatus of the invention and vice versa.

DETAILED DESCRIPTION

Figure 1A:
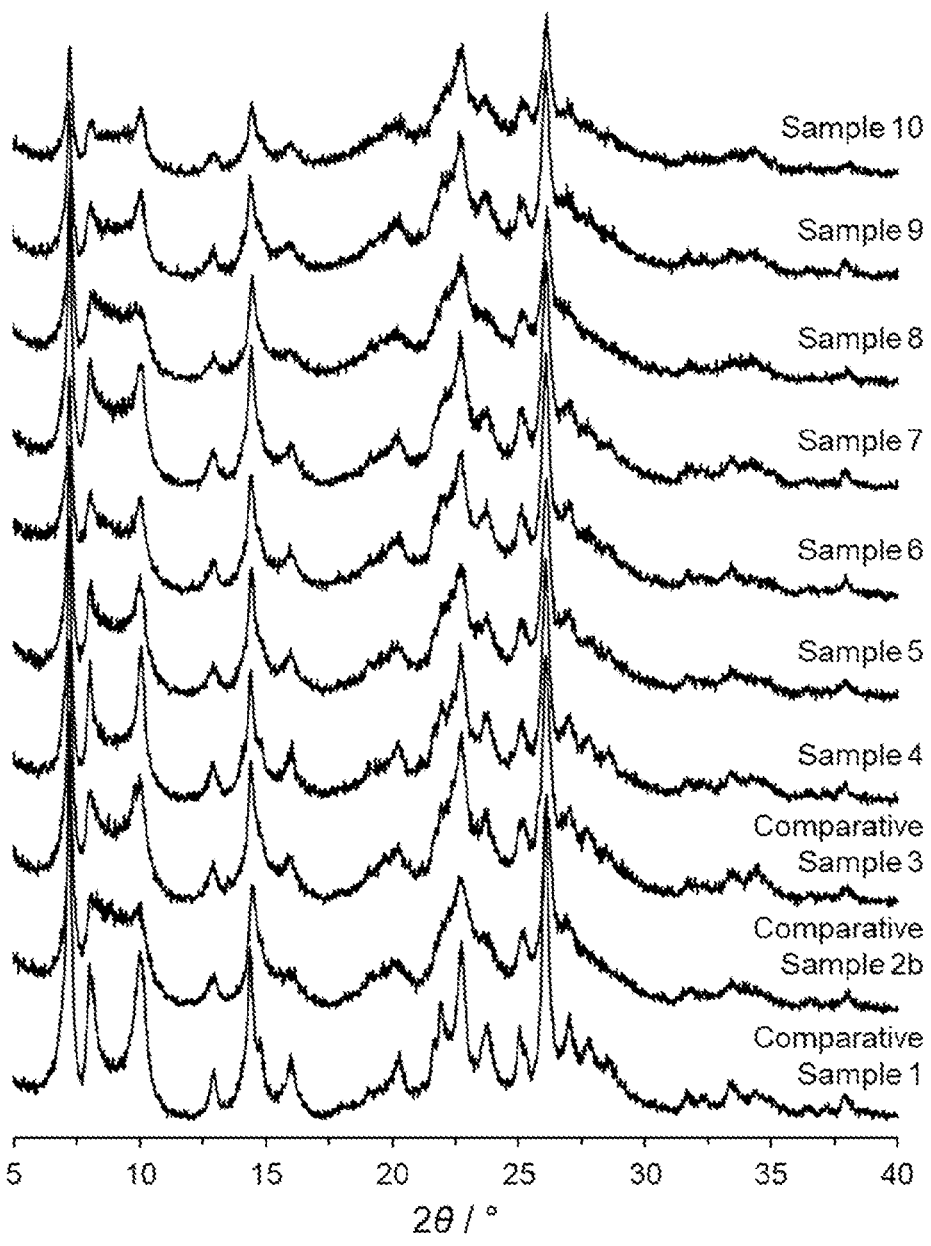
FIG. 1a shows XRD spectra of Comparative Samples 1, 2b, and 3, and Samples 4-10, of the Examples.

The method of synthesizing a molecular sieve of MWW framework type according to the invention involves preparing a synthesis mixture according to conventional techniques, except that the synthesis mixture comprises a potassium cation source. The method of synthesizing a molecular sieve according to the invention further involves crystallizing the molecular sieve according to conventional techniques, and isolating the molecular sieve according to conventional techniques.

The Synthesis Mixture

As mentioned above, the synthesis mixture can be prepared according to conventional methods. The components of the synthesis mixture may be combined in any order.

The synthesis mixture comprises a potassium cation source, such as potassium hydroxide, potassium aluminate, potassium silicate, a potassium salt such as KCl or KBr or potassium nitrate, or a combination thereof. Preferably, the potassium cation source comprises potassium hydroxide, for example the potassium cation source is potassium hydroxide. Optionally, the synthesis mixture has a molar ratio $(M+K^+):Si=0.11$ to $0.5$, e.g. $0.12$ to $0.3$, such as $0.15$ to $0.25$, for example $0.17$ to $0.22$. Optionally, the synthesis mixture has a molar ratio $K^+:Si=0.01$ to $0.5$, such as $0.01$ to $0.1$, for example $0.02$ to $0.05$.

The synthesis mixture further comprises a structure directing agent R. It will be appreciated that any structure directing agent suitable for formation of an MWW-type molecular sieve may be used. Suitable structure directing agents include cyclopentylamine, cyclohexylamine, cycloheptylamine, hexamethyleneimine (HMI), heptamethyleneimine, homopiperazine, and combinations thereof. Additionally or alternatively, the structure directing agent may be a diquat salt or a diquat hydroxide, such as a pentamethonium salt or hydroxide (e.g. pentamethonium bromide or hydroxide), hexamethonium salt or hydroxide (e.g. hexamethonium bromide or hydroxide), and/or a heptamethonium salt or hydroxide (such as heptamethonium bromide or hydroxide). Additionally or alternatively, the structure directing agent may be diethyl-dimethylammonium salt or hydroxide, or N,N,N-trimethyl-1-adamantanammonium salt or hydroxide, or N,N,N-trimethyl-2-adamantanammonium salt or hydroxide, e.g. chloride, bromide or hydroxide. Preferably the structure directing agent R is hexamethyleneimine (HMI). The structure directing agent R is present in a molar ratio relative to silicon of $R:Si=0.1$ to $1$, optionally $0.1$ to $0.5$, such as $0.15$ to $0.25$, for example $0.16$ to $0.20$.

The synthesis mixture comprises one or more sources of a trivalent element X such as aluminum, boron, and/or gallium, preferably X comprising Al, and more preferably X being Al. Suitable sources of trivalent element X that can be used to prepare the synthesis mixture depend on the element X that is selected. In embodiments where X is aluminum, Al sources (e.g. aluminum oxides) suitable for use in the method include aluminum salts, especially water-soluble salts, such as aluminum sulfate, aluminum nitrate, aluminum hydroxide, sodium aluminate, and aluminum alkoxides such as aluminum isopropoxide, as well as hydrated aluminum oxides, such as boehmite, gibbsite, and pseudoboehmite, and mixtures thereof. In embodiments where X is boron, B sources include boric acid, sodium tetraborate and potassium tetraborate. Sources of boron tend to be more soluble than sources of aluminum in hydroxide-mediated synthesis systems. In embodiments where X is gallium, Ga sources include sodium gallate, potassium gallate, and gallium salts such as gallium chloride, gallium sulfate, and gallium nitrate. Preferably, X is Al and the source of aluminum in the synthesis mixture comprises $Al_2O_3$, for example wherein the source of aluminum is sodium aluminate. The synthesis mixture has a molar ratio of $Si:X_2$ of at least $8$, preferably at least $10$, more preferably at least $12$, most preferably at least $13$, such as at least $15$. The synthesis mixture has a molar ratio of $Si:X_2$ of at most $18$, in particular at most $17$. The synthesis mixture may for instance have a molar ratio of $Si:X_2$ of $8$ to $18$, in particular $10$ to $18$, more particularly $12$ to $18$, most particularly $14$ to $18$, such as $15$ to $17$. Preferably X is Al.

Si sources (e.g. silicon oxides) suitable for use in the method include silicates, e.g., tetraalkyl orthosilicates such as tetramethylorthosilicate, fumed silica, such as Aerosil® (available from Degussa) and Cabosil® (available from DMS), precipitated silica such as Ultrasil® and Sipernat® 340 (available from Evonik), alkali metal silicates such as potassium silicate and sodium silicate, and aqueous colloidal suspensions of silica, for example, that sold by E.I. du Pont de Nemours under the tradename Ludox®.

Alternatively or in addition to previously mentioned sources of Si and Al, sources containing both Si and Al elements can also be used as sources of Si and Al. Examples of suitable sources containing both Si and Al elements include amorphous silica-alumina gels or dried silica alumina powders, silica aluminas, clays, such as kaolin, metakaolin, and zeolites, in particular aluminosilicates such as synthetic faujasite and ultrastable faujasite, for instance USY, beta or other large to medium pore zeolites.

Optionally, the synthesis mixture comprises one or more sources of a pentavalent element Z, such as phosphorus. Suitable sources of pentavalent elements Z depend on the element Z that is selected. Preferably, Z is phosphorus. Suitable sources of phosphorus include phosphoric acid, organic phosphates such as triethyl phosphate and tetraethylammonium phosphate, and aluminophosphates. Alternatively, the synthesis mixture does not contain any pentavalent element Z.

Optionally, the synthesis mixture comprises one or more sources of an alkali metal cation M, wherein M is not potassium. Optionally, M is lithium, rubidium and/or sodium, preferably sodium. Additionally or alternatively, the synthesis mixture optionally comprises one or more sources of an alkaline earth metal cation, such as magnesium and/or calcium. The sodium source, when present, may be sodium hydroxide, sodium aluminate, sodium silicate, sodium aluminate or sodium salts such as NaCl, NaBr or sodium nitrate. The lithium source, when present, may be lithium hydroxide or lithium such as LiCl, LiBr, LiI, lithium nitrate, or lithium sulfate. The rubidium source, when present, may be rubidium hydroxide or rubidium salts such as RbCl, RhBr, RBI, or rubidium nitrate. The calcium source, when present, may be calcium hydroxide, for example. The magnesium source, when present, may be magnesium hydroxide, for example. The synthesis mixture comprises M in a molar ratio of $M:K^+$ of $0$ to $10$. For example, the synthesis mixture does not contain any alkali metal cation M, i.e. the synthesis mixture does not contain any alkali metal other than potassium. Alternatively, the synthesis mixture optionally comprises M in a molar ratio of $M:K^+$ of $1$ to $8$, such as $2$ to $7$, preferably, wherein M is $Na^+$. Additionally or alternatively, the synthesis mixture comprises the alkali metal cation M source in a molar ratio of $M:Si$ of $0.1$ to $0.25$, such as $0.12$ to $0.22$, for example $0.14$ to $0.20$.

Optionally, the synthesis mixture comprises one or more sources of hydroxide ions, for example, an alkali metal hydroxide such as sodium hydroxide or potassium hydroxide or lithium hydroxide, most often potassium hydroxide and optionally sodium hydroxide. Hydroxide can also be present as a counter ion of the structure directing agent or by the use of aluminum hydroxide as a source of X. Alternatively, the synthesis mixture may be free from a hydroxide source. Optionally the synthesis mixture comprises a source of hydroxide ions in a OH⁻/Si molar ratio of from 0.1 to 0.5, optionally 0.15 to 0.25, for example 0.16 to 0.22. Preferably the hydroxide ion source is KOH and/or NaOH.

Optionally, the synthesis mixture comprises seed crystals in an amount of from 0.05 to 2, such as 0.1 to 1.5, for example 0.15 to 1 $g_{seed}$/$g_{(silicon\ source+source\ of\ trivalent\ element\ X)}$. The optional seed crystals can be of framework type MWW or of any other framework type wherein the synthesis mixture is capable of forming a molecular sieve of MWW framework type. Optionally the seed crystals comprise a molecular sieve of framework type MWW, for example wherein the seed crystals comprise, preferably consist of, MCM-49 and/or MCM-56 zeolite, preferably MCM-56 zeolite. Optionally, the seed crystals are included in the synthesis mixture in the form of a colloidal suspension in a liquid medium, such as water. As used herein, the expression "colloidal suspension" refers to a suspension containing discrete finely divided particles dispersed in a continuous liquid phase; preferably, it refers to a suspension that is stable, in the sense that no visible separation occurs or sediment forms, in a period sufficient for the use intended, advantageously for at least 10 hours, more advantageously at least 20 hours, preferably at least 100 hours, and more preferably at least 500 hours at ambient temperature (23° C.). The maximum size of the particles for the suspension to remain stable (peptized) will depend to some extent on their shape, and on the nature and pH of the continuous medium, as well as on the period during which the suspension must remain usable. The particles may be spherical, or of other shapes. Where particles are other than spherical, the dimension referred to is their smallest dimension. The colloidal seeds generally have an average diameter (or smallest dimension, corresponding to the number-average primary particle size as determined by SEM for 100 or more particles) of 300 nm or less, in particular of 200 nm or less, more particularly of 100 nm or less, provided that said colloidal seeds form a stable suspension, in the sense that no visible separation occurs or sediment forms, in a period sufficient for the use intended. The production of colloidal seed suspensions and their use in the synthesis of molecular sieves are disclosed in, for example, International Patent Application Publication Nos. WO2000/006493 and WO2000/006494.

Optionally, the synthesis mixture comprises $H_2O$ and $SiO_2$ in a $H_2O:SiO_2$ ratio of from 5 to 100, such as from 10 to 50, for example from 15 to 25.

Optionally, the synthesis comprises a zeolite growth modifier. It will be appreciated that any suitable zeolite growth modifier may be used.

Crystallization and Recovery

Optionally, the crystallization conditions in step (b) of the method include a temperature of from 100° C. to 200° C., preferably from 140° C. to 160° C., for instance 145° C. to 155° C., for example about 150° C.

The time required for the crystallization to be carried under will vary. For example, at higher temperatures, the crystallization time may be reduced. Optionally, the crystallization conditions in step (b) of the method include heating for a period of from 1 to about 800 hours, such as from about 10 to less than 600 hours, in particular from about 24 to 140 hours, for example from about 60 to about 90 hours. The crystallization time can be established by methods known in the art such as by sampling the synthesis mixture at various times and determining the yield and x-ray crystallinity of precipitated solid.

Crystallization can be carried out in any suitable reactor vessel, such as, for example, a polypropylene jar or a Teflon® bottle, an acid digestion vessel, a Teflon® lined or stainless steel autoclave, a plough shear mixer, or a reaction kettle, preferably a polypropylene jar, a Teflon® bottle, or a Teflon® lined or stainless steel autoclave.

Optionally, the synthesis mixture is subjected to agitation during step (b), for example the conditions in step (b) include stirring. Optionally, the synthesis mixture is stirred for at least a portion of step (b), such as throughout step (b). Alternatively, the synthesis mixture is not stirred during step (b), i.e. crystallization is carried out under static conditions. Optionally during step (b), the synthesis mixture is heated with agitation provided by a mixing device which moves the mixture in a turbulent fashion such as occurs with a pitch blade turbine mixer. Other means of introducing agitation known to one skilled in the art can be employed, such as pumping the synthesis mixture around the vessel holding the mixture. The purpose of the agitation is to assist mass and heat transfer through the synthesis mixture in a uniform manner. The degree of agitation should be low enough to minimize shear-induced seed formation in the synthesis mixture. The tip speed of the mixer can also be varied depending on the temperature distribution of the synthesis mixture and changes in mixture viscosity during heat up. Preferably a constant tip speed of about 1-2.0 M/s is used until a temperature from about 100° C. to about 120° C. is reached, and then the tip speed is increased gradually as heat up continues. Most preferably the maximum tip speed is about 2-5 M/s at a temperature of about 130° C. to about 150° C., and most preferably from about 2 to about 3.5 M/s at a temperature from about 140° C. to about 150° C. The period during which the synthesis mixture is heated up should be as fast as practical to minimize the amount of time the synthesis mixture is agitated to reduce shear induced seeding. Optionally, the time during which stirring occurs at temperatures above 130° C. is less than about 6 hours, such as less than 3 hours. Optionally, agitation is stopped once the synthesis mixture reaches a pre-determined set temperature. Optionally, heating of the synthesis mixture continues after the stop of agitation. Alternatively, temperature can be maintained at the temperature reached when agitation was stopped. It will be appreciated that the synthesis mixture may optionally be agitated (e.g. stirred) after step (b). Optionally, the synthesis mixture is subjected to discontinuous stirring while heating, according to which the synthesis mixture may be subjected to a plurality of static crystallization steps separated by agitated crystallization steps. For example, step (b) of the method may be repeated following a step of heating the synthesis mixture under stirred crystallization conditions, said crystallization conditions including a temperature of from 100° C. to 220° C.

Optionally, the crystallization conditions of step (b) include a temperature equal to or greater than the effective nucleation temperature of the synthesis mixture. The effective nucleation temperature can be understood to be the temperature at which continued stirring of the heated zeolite synthesis mixture would result in significant decrease of the mass mean crystal diameter of the product zeolite crystals, e.g., a reduction of the mass mean crystal diameter of the product crystals of 15 percent or greater. Preferably, the temperature of step (b) of the method is a temperature at which, if the synthesis mixture is stirred, stirring will result in a reduction of the mass mean crystal diameter of the product zeolite crystals of less than 10 percent, more preferably less than 5 percent, as compared to the product zeolite crystals obtained from a corresponding unstirred synthesis mixture. It will be appreciated that the effective nucleation temperature of the synthesis mixture will depend on the composition of the synthesis mixture which in turn will be governed by the zeolite being prepared. The effective nucleation temperature can be confirmed by procedures known in the art such as by x-ray detection of crystal presence greater than any seed level. Changes in synthesis mixture viscosity during the first period can also be used to determine the onset of crystallization. The effective nucleation temperature will be a function of the type of zeolite being prepared and may often be expressed as a temperature range rather than a single sharply defined temperature.

Processing the Molecular Sieve

As a result of the crystallization process, the recovered molecular sieve product contains within its pores at least a portion of the structure directing agent used in the synthesis. Preferably, the method additionally comprises activating the molecular sieve to remove the structure directing agent from the molecular sieve, leaving active sites within the microporous channels of the molecular sieve open for contact with a feedstock. The activation process is typically accomplished by calcining, or essentially heating the molecular sieve comprising the template in the presence of an oxygen-containing gas. In some cases, it may be desirable to heat the molecular sieve in an environment having a low or zero oxygen concentration. This type of process can be used for partial or complete removal of the structure directing agent from the intracrystalline pore system. In other cases, particularly with smaller structure directing agents, complete or partial removal from the sieve can be accomplished by conventional desorption processes. Typically, the recovered molecular sieve is subjected to a calcining step involving heating the material at a temperature of at least about 200° C., preferably at least about 300° C., more preferably at least about 370° C. for at least 1 minute and generally not longer than 20 hours. While subatmospheric pressure can be employed for the thermal treatment, atmospheric pressure is usually desired for reasons of convenience. The thermal treatment can be performed at a temperature up to about 925° C. For instance, the thermal treatment can be conducted at a temperature of from 300 to 600° C., for instance from 400 to 550° C., such as from 500 to 550° C., in the presence of an oxygen-containing gas, for example, in air and/or ozone.

The molecular sieve may also be subjected to an ion-exchange treatment, for example, with aqueous ammonium salts, such as ammonium nitrates, ammonium chlorides, and ammonium acetates, in order to remove remaining alkali metal cations and/or alkaline earth metal cations and to replace them with protons thereby producing the acid form of the molecular sieve. To the extent desired, the original cations of the as-synthesized material, such as alkali metal cations, can be replaced by ion exchange with other cations. Preferred replacing cations can include hydrogen ions, hydrogen precursor, e g ammonium ions and mixtures thereof. The ion exchange step may take place after the as-made molecular sieve is dried. The ion-exchange step may take place either before or after a calcination step.

The molecular sieve may also be subjected to other treatments such as steaming and/or washing with solvent. Such treatments are well-known to the skilled person and are carried out in order to modify the properties of the molecular sieve as desired.

Once the molecular sieve has been synthesized, it can be formulated into a product composition by combination with other materials, such as binders and/or matrix materials that provide additional hardness to the finished product. These other materials can be inert or catalytically active materials.

In particular, it may be desirable to incorporate the molecular sieve of the present invention or manufactured by the process of the present invention with another material that is resistant to the temperatures and other conditions employed during use. Such materials include synthetic or naturally occurring zeolites as well as inorganic materials such as clays, silica and/or metal oxides such as alumina, yttria, zirconia, gallium oxide, zinc oxide and mixtures thereof. The metal oxides may be either naturally occurring or in the form of gelatinous precipitates or gels including mixtures of silica and metal oxides. Naturally occurring clays which may be used include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or after being subjected to calcination, acid treatment or chemical modification. These binder materials are resistant to the temperatures and other conditions, e.g., mechanical attrition, which occur in various hydrocarbon separation processes. Thus the molecular sieve of the present invention or manufactured by the process of the present invention may be used in the form of an extrudate with a binder. They are typically bound by forming a pill, sphere, or extrudate. The extrudate is usually formed by extruding the molecular sieve, optionally in the presence of a binder, and drying and calcining the resulting extrudate. Further treatments such as steaming, and/or ion exchange may be carried out as required. The molecular sieve may optionally be bound with a binder having a surface area of at least 100 m²/g, for instance at least 200 m²/g, optionally at least 300 m²/g.

These materials may be incorporated into naturally occurring clays, e.g., bentonite and kaolin, to improve the crush strength of the product under commercial operating conditions.

In addition to the foregoing materials, the molecular sieve of the present invention can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of molecular sieve and inorganic oxide matrix may vary widely, with the molecular sieve content ranging from about 1 to about 100 percent by weight and more usually, particularly when the composite is prepared in the form of extrudates, in the range of about 2 to about 95, optionally from about 20 to about 90 weight percent of the composite.

The Molecular Sieve

The present invention also provides a molecular sieve of MWW framework type obtainable by or made according to the method of the invention. It will be understood by a person skilled in the art that the molecular sieve of MWW framework type of the present invention may contain impurities, such as amorphous materials; unit cells having non-MWW framework topologies (e.g., MFI, MTW, MOR, FER, quartz, tridymite or other dense phases that may or may not impact the performance of the resulting catalyst); and/or other impurities (e.g., heavy metals and/or organic hydrocarbons). Typical examples of the non-MWW framework type molecular sieve co-existing with the MWW framework type molecular sieve of the present invention are Kenyaite, EU-1, ZSM-50, ZSM-12, ZSM-48, ZSM-5, Ferrierite, Mordenite, Sodalite, and/or Analcine. Other examples are molecular sieves having framework type of EUO, MTW, FER, MOR, SOD, ANA, and/or MFI. The MWW framework type molecular sieve of the present invention are preferably substantially free of impurities. The term "substantially free of impurities" used herein means the MWW framework type molecular sieve of the present invention preferably contains a minor proportion (less than 50 wt %), preferably less than 20 wt %, more preferably less than 10 wt %, even more preferably less than 5 wt % and most preferably less than 1 wt %, of such impurities (or "non-MWW framework type molecular sieve"), which weight percent (wt %) values are based on the combined weight of impurities and pure phase MWW framework type molecular sieve. The amount of impurities can be appropriately determined by powder XRD, rotating electron diffraction, and/or SEM/TEM (e.g. different crystal morphologies).

Optionally, the molecular sieve of MWW framework type has, in its calcined and anhydrous form, a composition with a $Si/X_2$ molar ratio of no more than 16, such as no more than 15.5 or no more than 15. Optionally, the $Si/X_2$ molar ratio is at least 8, preferably at least 10, more preferably at least 12, most preferably at least 13, such as at least 14. Optionally, the $Si/X_2$ molar ratio is from 8 to 16, or 10 to 16, especially 12 to 16 or 13 to 16, such as 13 to 15 or 14 to 15. It will be understood that the $Si:X_2$ molar ratio is the molar ratio in the molecular sieve framework. Any suitable method can be used to verify the composition of a molecular sieve material, such as inductively coupled plasma optical emission spectrometry (ICP-OES) analysis. Preferably, X is Al. $^{27}Al$ NMR spectroscopy can be used to determine whether Al detected in a molecular sieve sample is Al incorporated into the molecular sieve framework, or Al deposited on the material as an impurity. It will be appreciated that extra-framework aluminum can be expected to visible by $^{27}Al$ NMR spectroscopy as a signal having a chemical shift ($\delta$) of around 0 ppm. Framework Al is visible by $^{27}Al$ NMR spectroscopy as a signal having a shift ($\delta$) close to 50 ppm.

Optionally, the molecular sieve of MWW framework type has, in its dried as-synthesized form, a (K+M) content of about 0.5 to about 5 wt %, such as about 1 to about 4.5 wt %, for example about 2 to about 4 wt %, based on the weight of the dried molecular sieve. Additionally or alternatively, the molecular sieve has, in its dried as-synthesized form, a K content of from about 0.4 to about 4 wt %, such as about 0.6 to about 3 wt %, for example about 1 to about 2 wt %, based on the weight of the dried molecular sieve. Optionally, the molecular sieve of MWW framework type has, in its calcined and ion-exchanged form, a (K+M) content of about 0.02 to about 1 wt %, such as about 0.05 to about 0.8 wt %, for example about 0.1 or less than 0.1 to about 0.5 wt %, based on the weight of the calcined and ion-exchanged molecular sieve, optionally wherein the calcined and ion-exchanged molecular sieve has a M:K weight ratio of about 0 to about 2, such as about 0.2 to about 1.8, for example about 0.3 to about 1.5. Additionally or alternatively, the molecular sieve has, in its calcined and ion-exchanged form, a K content of from about 0.02 to about 1 wt %, such as about 0.04 to about 0.6 wt %, for example about 0.06 to about 0.4 wt %, based on the weight of the calcined and ion-exchanged molecular sieve.

Typically, the molecular sieve product is formed in solution and can be recovered by standard means, such as by centrifugation or filtration. The separated product can also be washed, recovered by centrifugation or filtration and dried.

Optionally, the molecular sieve of MWW framework type has, in its calcined and ion-exchanged form, a nitrogen Brunauer-Emmett-Teller (BET) surface area ($N_2$ $S_{BET}$) of from 250 to 500, such as 280 to 480, for example 390 to 460 $m^2/g$. Optionally, the molecular sieve of MWW framework type has, in its calcined and ion-exchanged form, an nitrogen external surface area ($N_2$ $S_{ext}$) (also commonly referred to as mesopore surface area) of 80 to 160, such as 90 to 150, for example 115 to 140 $m^2/g$. Optionally, the molecular sieve of MWW framework type has, in its calcined and ion-exchanged form, a micropore volume ($V_{micro}$) of 0.08 to 0.2, such as 0.09 to 0.18, for example 0.1 to 0.15 $cm^3/g$. A suitable method for obtaining $N_2$ $S_{ext}$ and $V_{micro}$ is by application of the t-plot model to the $N_2$ isotherm, as referenced in "Analytical Methods in Fine Particle Technology, P. A. Webb and C. Orr, Micrometrics Instrument Corporation, ISBN 0-9656783-0-X", the contents of which are hereby incorporated by reference. Optionally, the molecular sieve of MWW framework type has, in its calcined and ion-exchanged form, an $N_2$ $S_{ext}/S_{BET}$ ratio of at least 25%, such as at least 28%, optionally an $N_2$ $S_{ext}/S_{BET}$ ratio of 25 to 45, such as 26 to 40, for example 28 to 35%.

Optionally, the molecular sieve of MWW framework type has, in its as-synthesized and dried form, a density as measured by a pycnometer (i.e. density of the powder material), of more than 2.0 $g/cm^3$, such as at least 2.05 $g/cm^3$, for example at least 2.1 $g/cm^3$, or even more than 2.1 $g/cm^3$.

Use of the Molecular Sieve

The molecular sieve of MWW framework type of this invention may be used as an adsorbent, such as for separating at least one component from a mixture of components in the vapor or liquid phase having differential sorption characteristics with respect to the molecular sieve. Therefore, at least one component can be partially or substantially totally separated from a mixture of components having differential sorption characteristics with respect to the molecular sieve by contacting the mixture with the molecular sieve to selectively sorb the one component.

The molecular sieve of this invention can be used to catalyze a wide variety of chemical conversion processes including many of present commercial/industrial importance. Examples of chemical conversion processes which are effectively catalyzed by the molecular sieve, by itself or in combination with one or more other catalytically active substances including other crystalline catalysts, include those requiring a catalyst with acid activity. Specific examples include:

(1) alkylation of aromatic hydrocarbons, e.g., benzene, with long chain olefins, e.g., $C_{14}$ olefin, with reaction conditions including a temperature of from about 340° C. to about 500° C., a pressure of from about atmospheric to about 200 atmospheres, a weight hourly space velocity of from about 2 $hr^{-1}$ to about 2000 $hr^{-1}$ and an aromatic hydrocarbon/olefin mole ratio of from about 1/1 to about 20/1, to provide long chain alkyl aromatics which can be subsequently sulfonated to provide synthetic detergents;

(2) alkylation of aromatic hydrocarbons with gaseous olefins to provide short chain alkyl aromatic compounds, e.g., the alkylation of benzene with ethylene to provide ethylbenzene, with reaction conditions including a temperature of from about 170° C. to about 260° C., a pressure of from about 20 to about 55 atmospheres, and an ethylene alkylating agent weight hourly space velocity (WHSV) of from 0.1 hr$^{-1}$ to about 20 hr$^{-1}$, or the alkylation of benzene with propylene to provide cumene, with reaction conditions including a temperature of from about 10° C. to about 125° C., a pressure of from about 1 to about 30 atmospheres, and an aromatic hydrocarbon weight hourly space velocity (WHSV) of from 5 hr$^{-1}$ to about 50 hr$^{-1}$;

(3) alkylation of reformate containing substantial quantities of benzene and toluene with fuel gas containing C$_5$ olefins to provide, inter alia, mono- and dialkylates with reaction conditions including a temperature of from about 315° C. to about 455° C., a pressure of from about 400 to about 800 psig, a WHSV-olefin of from about 0.4 hr$^{-1}$ to about 0.8 hr$^{-1}$, a WHSV-reformate of from about 1 hr$^{-1}$ to about 2 hr$^{-1}$ and a gas recycle of from about 1.5 to 2.5 vol/vol fuel gas feed;

(4) alkylation of aromatic hydrocarbons, e.g., benzene, toluene, xylene and naphthalene, with long chain olefins, e.g., C$_{14}$ olefin, to provide alkylated aromatic lube base stocks with reaction conditions including a temperature of from about 160° C. to about 260° C. and a pressure of from about 350 to 450 psig;

(5) alkylation of phenols with olefins or equivalent alcohols to provide long chain alkyl phenols with reaction conditions including a temperature of from about 200° C. to about 250° C., a pressure of from about 200 to 300 psig and a total WHSV of from about 2 hr$^{-1}$ to about 10 hr$^{-1}$; and (6) alkylation of isoalkanes, e.g., isobutane, with olefins, e.g., 2-butene, with reaction conditions including a temperature of from about −25° C. to about 400° C., e.g., from 75° C. to 200° C., a pressure of from below atmospheric to about 35,000 kPa (5,000 psig), e.g., from 100 to 7,000 kPa (1 to 1,000 psig), a weight hourly space velocity based on olefin of from about 0.01 hr$^{-1}$ to about 100 hr$^{-1}$, e.g., from 0.1 hr$^{-1}$ to 20 hr$^{-1}$, and a mole ratio of total isoalkane to total olefin of from about 1:2 to about 100:1, e.g., from 3:1 to 30:1.

The molecular sieve of this invention can also be suitable for the preparation of catalysts for the conversion of alcohols to high octane fuels, jet and diesels.

The invention will now be more particularly described with reference to the following Examples.

EXAMPLES

In these examples, the XRD diffraction patterns of the as-synthesized materials were recorded on an X-Ray Powder Diffractometer (Bruker, D8 Discover or STOE, Stadi P Combi) using copper K-α radiation in the 2θ range of 2 to 40 degrees.

The SEM images were obtained on a FEI Company, Helios Nanolab G3 UC Scanning Electron Microscope (SEM).

The solid state $^{27}$Al MAS NMR spectra (1 pulse) were recorded on a Bruker Avance III-HD 500 spectrometer (11.7 T) operating at 130.3 MHz. The measurements were done using zirconia rotors of 4 mm outer diameter spun at 14 kHz. MAS NMR spectra were obtained with a n/12 pulse and a recycle delay of 1 s. Chemical shifts were referenced to 1 M Al(NO$_3$)$_3$ solution. The samples were hydrated over night before the analysis.

The density of the powder materials was measured using a pycnometer. Pycnometer was weighed empty then was filled with water to determine the exact volume. An exact know amount of the material was added in the pycnometer which was then filled with water. Air trapped in between the powder materials was removed by placing the pycnometer in a sonic bath. The material was allowed to settle until the top liquor was clear. The pycnometer was then filled with water and weighed. The volume of the powder was determined based on the weight difference and density was calculated based on the weight and the volume.

As used herein, XRD refers to x-ray powder diffraction. Zeolites of the comparative samples were identified by comparison of their XRD patterns to those of known zeolite materials. SEM images were used to aid assessment of product purity—the presence of obviously different crystal morphologies in an SEM image can be an indication of impurities in the form of other crystalline materials. Such an approximate analysis can be especially useful in identifying the presence of formation of relatively minor amounts of crystalline impurities which may not be identifiable on product XRD patterns. As used herein, SDA is a structure directing agent.

Comparative Sample 1 is an MCM-49 zeolite prepared according to the method disclosed below. Comparative Samples 2a and 2b are MCM-56 zeolites prepared according to the method disclosed below, and adapted from the method disclosed in U.S. Pat. No. 5,362,697. Comparative Sample 3 is an MWW zeolite synthesized according to the method below. Samples 4-10 are MWW zeolites prepared by methods according to the invention, the syntheses of which are disclosed below. Comparative Sample 11 was prepared according to the synthesis method of Comparative Sample 3, except that the synthesis mixture did not include a potassium source, and was stirred for 60 hours at 160° C.

Synthesis of Comparative Sample 1—MCM-49 Zeolite

A sodium aluminate solution was prepared by dissolving sodium aluminate powder in water (23.5 wt % alumina, 19.4 wt % sodium oxide). 18,891.0 mg water, 1,192.4 mg of the sodium aluminate solution, 89.6 mg of a sodium hydroxide solution (40.0 wt %), 3,779.3 mg precipitated silica (Ultrasil® VN3), and 1,047.7 mg of a hexamethyleneimine solution (99.0 wt %) were added to a Teflon® liner. The mixture was stirred for 5 minutes after each addition and for 10 minutes after the last addition. The mixture was then treated under hydrothermal conditions at 160° C. for 60 hours while stirring with a U-shaped impeller. The solid material was recovered afterwards, washed several times with water, and dried at 120° C.

The synthesis mixture was as follows (synthesis mixture/molar ratios):

Si/Al$_2$: 20.84, (Na$^+$+K$^+$)/Si: 0.15, K$^+$/Na$^+$: 0.00, SDA/Si: 0.18, H$_2$O/Si: 19.02.

XRD was used to identify the recovered material as MCM-49.

Synthesis of Comparative Sample 2a—MCM-56 zeolite

A sodium aluminate solution was prepared by dissolving sodium aluminate powder in water (23.5 wt % alumina, 19.4 wt % sodium oxide). 18,986.0 mg water, 1,332.1 mg of the sodium aluminate solution, 183.8 mg MCM-56 seeds (20.0 wt %), 3,846.5 mg precipitated silica (Ultrasil®VN3), and 651.6 mg of a hexamethyleneimine solution (99.0 wt %) were added to a Teflon® liner. The mixture was stirred for 5 minutes after each addition and for 10 minutes after the last addition. The mixture was then treated under hydrothermal conditions at 160° C. for 60 hours while stirring with a U-shaped impeller. The solid material was recovered afterwards, washed several times with water, and dried at 120° C.

The synthesis mixture was as follows (synthesis mixture/ molar ratios, excluding seed crystals):

Si/Al$_2$: 19.01, (Na$^+$+K$^+$)/Si: 0.14, K$^+$/Na$^+$: 0.00, SDA/Si: 0.11, H$_2$O/Si: 18.94.

The amount of seed crystals used was 0.95 wt % [g$_{seed}$ (g$_{SiO2}$+g$_{Al2O3}$)$^{-1}$].

XRD was used to identify the recovered material as MCM-56.

Synthesis of Comparative Sample 2b—MCM-56 Zeolite

The procedure of Comparative Sample 2a was repeated.

XRD was used to identify the recovered material as MCM-56.

Synthesis of Comparative Sample 3—MWW-Type Zeolite

A sodium aluminate solution was prepared by dissolving sodium aluminate powder in water (10.0 wt % alumina, 7.4 wt % sodium oxide). 16,291.6 mg water, 3,406.8 mg of the sodium aluminate solution, 503.5 mg of a sodium hydroxide solution (20.0 wt %), 3,756.6 mg precipitated silica (Ultrasil®VN3), and 1,041.4 mg of a hexamethyleneimine solution (99.0 wt %) were added to a Teflon® liner. The mixture was stirred for 5 minutes after each addition and for 10 minutes after the last addition. The mixture was then treated under hydrothermal conditions at 150° C. for 65 hours while stirring with a U-shaped impeller. The solid material was recovered afterwards, washed several times with water, and dried at 120° C.

The synthesis mixture was as follows (synthesis mixture/ molar ratios):

Si/Al$_2$: 17.00, (Na$^+$+K$^+$)/Si: 0.19, K$^+$/Na$^+$: 0.00, SDA/Si: 0.18, H$_2$O/Si: 19.02.

XRD was used to identify the recovered material as an MWW-type zeolite.

Synthesis of Sample 4—MWW-Type Zeolite

A sodium aluminate solution was prepared by dissolving sodium aluminate powder in water (10.1 wt % alumina, 7.4 wt % sodium oxide). 14,784.6 mg water, 3,392.0 mg of the sodium aluminate solution, 2,045.6 mg of a potassium hydroxide solution (10.0 wt %), 3,740.8555 mg precipitated silica (Ultrasil® VN3), and 1,037.0167 mg of a hexamethyleneimine solution (99.0 wt %) were added to a Teflon® liner. The mixture was stirred for 5 minutes after each addition and for 10 minutes after the last addition. The mixture was then treated under hydrothermal conditions at 150° C. for 65 hours while stirring with a U-shaped impeller. The solid material was recovered afterwards, washed several times with water, and dried at 120° C.

The synthesis mixture was as follows (synthesis mixture/ molar ratios):

Si/Al$_2$: 17.00, (Na$^+$+K$^+$)/Si: 0.21, K$^+$/Na$^+$: 0.43, SDA/Si: 0.18, H$_2$O/Si: 19.02.

XRD was used to identify the recovered material as an MWW-type zeolite.

Synthesis of Sample 5—MWW-Type Zeolite

A sodium aluminate solution was prepared by dissolving sodium aluminate powder in water (9.6 wt % alumina, 7.1 wt % sodium oxide). 15,444.4 mg water, 3,574.1 mg of the sodium aluminate solution, 802.2720 mg of a potassium hydroxide solution (10.0 wt %), 3,753.3 mg precipitated silica (Ultrasil®VN3), and 1,040.5 mg of a hexamethylene-imine solution (99.0 wt %) were added to a Teflon® liner. The mixture was stirred for 5 minutes after each addition and for 10 minutes after the last addition. The mixture was then treated under hydrothermal conditions at 150° C. for 70 hours while stirring with a U-shaped impeller. The solid material was recovered afterwards, washed several times with water, and dried at 120° C.

The synthesis mixture was as follows (synthesis mixture/ molar ratios):

Si/Al$_2$: 17.00, (Na$^+$+K$^+$)/Si: 0.19, K$^+$/Na$^+$: 0.15, SDA/Si: 0.18, H$_2$O/Si: 19.02.

XRD was used to identify the recovered material as an MWW-type zeolite.

Synthesis of Sample 6—MWW-Type Zeolite

A sodium aluminate solution was prepared by dissolving sodium aluminate powder in water (10.1 wt % alumina, 7.4 wt % sodium oxide). 15,411.3 mg water, 3,391.2 mg of the sodium aluminate solution, 1,407.3 mg of a potassium hydroxide solution (10.0 wt %), 3,750.5 mg precipitated silica (Ultrasil®VN3), and 1,039.7 mg of a hexamethylene-imine solution (99.0 wt %) were added to a Teflon® liner. The mixture was stirred for 5 minutes after each addition and for 10 minutes after the last addition. The mixture was then treated under hydrothermal conditions at 150° C. for 65 hours while stirring with a U-shaped impeller. The solid material was recovered afterwards, washed several times with water, and dried at 120° C.

The synthesis mixture was as follows (synthesis mixture/ molar ratios):

Si/Al$_2$: 17.00, (Na$^+$+K$^+$)/Si: 0.19, K$^+$/Na$^+$: 0.30, SDA/Si: 0.18, H$_2$O/Si: 19.02.

XRD was used to identify the recovered material as an MWW-type zeolite.

Synthesis of Sample 7—MWW-Type Zeolite

A sodium aluminate solution was prepared by dissolving sodium aluminate powder in water (10.1 wt % alumina, 7.4 wt % sodium oxide). 14,834.2 mg water, 3,400.0 mg of the sodium aluminate solution, 1,405.2 mg of a potassium hydroxide solution (10.0 wt %), 571.4 mg MCM-49 seeds (1 wt %), 3,749.7 mg precipitated silica (Ultrasil®VN3), and 1,039.5 mg of a hexamethyleneimine solution (99.0 wt %) were added to a Teflon® liner. The mixture was stirred for 5 minutes after each addition and for 10 minutes after the last addition. The mixture was then treated under hydrother-mal conditions at 150° C. for 65 hours while stirring with a U-shaped impeller. The solid material was recovered after-wards, washed several times with water, and dried at 120° C.

The synthesis mixture was as follows (synthesis mixture/ molar ratios, excluding seed crystals):

Si/Al$_2$: 17.0, (Na$^+$+K$^+$)/Si: 0.19, K$^+$/Na$^+$: 0.30, SDA/Si: 0.18, H$_2$O/Si: 19.02.

The amount seed crystals used was 0.15 wt % [g$_{seed}$ (g$_{SiO2}$+ g$_{Al2O3}$)$^{-1}$].

XRD was used to identify the recovered material as an MWW-type zeolite.

Synthesis of Sample 8—MWW-Type Zeolite

A sodium aluminate solution was prepared by dissolving sodium aluminate powder in water (9.6 wt % alumina, 7.1 wt % sodium oxide). 15,678.3 mg water, 3,577.6 mg of the sodium aluminate solution, 184.8 mg of a sodium hydroxide solution (10.0 wt %), 760.8 mg of a potassium hydroxide solution (10.0 wt %), 3,757.0 mg precipitated silica (Ultrasil®VN3), and 1,041.5 mg of a hexamethyleneimine solution (99.0 wt %) were added to a Teflon® liner. The mixture was stirred for 5 minutes after each addition and for 10 minutes after the last addition. The mixture was then treated under hydrothermal conditions at 150° C. for 70 hours while stirring with a U-shaped impeller. The solid material was recovered afterwards, washed several times with water, and dried at 120° C.

The synthesis mixture was as follows (synthesis mixture/molar ratios):

$Si/Al_2$: 17.00, $(Na^++K^+)/Si$: 0.18, $K^+/Na^+$: 0.15, SDA/Si: 0.18, $H_2O/Si$: 19.02.

XRD was used to identify the recovered material as an MWW-type zeolite.

Synthesis of Sample 9—MWW-Type Zeolite

A sodium aluminate solution was prepared by dissolving sodium aluminate powder in water (10.1 wt % alumina, 7.4 wt % sodium oxide). 15,411.6 mg water, 3,597.7 mg of the sodium aluminate solution, 1,442.9 mg of a potassium hydroxide solution (10.0 wt %), 3,744.4 mg precipitated silica (Ultrasil®VN3), and 1,038.0 mg of a hexamethylene-imine solution (99.9 wt %) were added to a Teflon® liner. The mixture was stirred for 5 minutes after each addition and for 10 minutes after the last addition. The mixture was then treated under hydrothermal conditions at 150° C. for 70 hours while stirring with a U-shaped impeller. The solid material was recovered afterwards, washed several times with water, and dried at 120° C.

The synthesis mixture was as follows (synthesis mixture/molar ratios):

$Si/Al_2$: 16.00, $(Na^++K^+)/Si$: 0.20, $K^+/Na^+$: 0.29, SDA/Si: 0.18, $H_2O/Si$: 19.02.

XRD was used to identify the recovered material as an MWW-type zeolite.

Synthesis of Sample 10—MWW-Type Zeolite

A sodium aluminate solution was prepared by dissolving sodium aluminate powder in water (10.1 wt % alumina, 7.4 wt % sodium oxide). 14,953.3 mg water, 3,833.8 mg of the sodium aluminate solution, 1,438.6 mg of a potassium hydroxide solution (10.0 wt %), 3,738.1 mg precipitated silica (Ultrasil®VN3), and 1,036.2 mg of a hexamethylene-imine solution (99.0 wt %) were added to a Teflon® liner. The mixture was stirred for 5 minutes after each addition and for 10 minutes after the last addition. The mixture was then treated under hydrothermal conditions at 150° C. for 80 hours while stirring with a U-shaped impeller. The solid material was recovered afterwards, washed several times with water, and dried at 120° C.

The synthesis mixture was as follows (synthesis mixture/molar ratios):

$Si/Al_2$: 15.00, $(Na^++K^+)/Si$: 0.21, $K^+/Na^+$: 0.27, SDA/Si: 0.18, $H_2O/Si$: 19.02.

The crystallite phase according to XRD was MWW-type zeolite.

Synthesis of Comparative Sample 11—Mordenite

A sodium aluminate solution was prepared by dissolving sodium aluminate powder in water (23.5 wt % alumina, 19.4 wt % sodium oxide). 17,727.7 mg water, 1,441.2 mg of the sodium aluminate solution, 1,084.5 mg of a sodium hydroxide solution (40.0 wt %), 3,716.3 mg precipitated silica (Ultrasil®VN3) and 1,030.2 mg of a hexamethyleneimine solution (99.0 wt %) were added to a Teflon® liner. The mixture was stirred for 5 minutes after each addition and for 10 minutes after the last addition. The mixture was then treated under hydrothermal conditions at 160° C. for 60 hours while stirring with a U-shaped impeller. The solid material was recovered afterwards, washed several times with water, and dried at 120° C.

The synthesis mixture was as follows (synthesis mixture/molar ratios):

$Si/Al_2$: 17.00, $(Na^++K^+)/Si$: 0.19, $K^+/Na^+$: 0.00, SDA/Si: 0.18, $H_2O/Si$: 19.02.

XRD was used to identify the recovered material as mordenite.

Analysis of Crystalline Material Products

Table 1 shows the silica, alumina, sodium and potassium cation content of the samples as-prepared and also after ion-exchange. For each sample subjected to ion-exchange and calcination, the procedure used was as follows: the as-prepared sample was washed three times with a 1M ammonium nitrate solution and then calcined at 537° C. for 10 hours.

TABLE 1

| Composition of as-prepared crystallites and crystallites after ion-exchange | | | | | |
| --- | --- | --- | --- | --- | --- |
| | | Na (wt %) | | K (wt %) | |
| Sample | $Si/Al_2$[1] | As-prepared | Upon ion-exchange | As-prepared | Upon ion-exchange |
| Comparative Sample 1 | 18.07 | 1.19 | 0.08 | 0.01 | N/A |
| Comparative Sample 2a | 16.72 | — | 0.29 | N/A | N/A |
| Comparative Sample 2b | 17.27 | — | 0.10 | N/A | N/A |
| Comparative Sample 3 | 15.26 | — | 0.05 | N/A | N/A |
| Sample 4 | 15.16 | — | 0.13 | — | 0.34 |
| Sample 5 | 14.78 | — | 0.20 | — | 0.18 |
| Sample 6 | 15.14 | 1.00 | 0.04 | 1.22 | 0.07 |
| Sample 7 | 15.36 | — | 0.12 | — | 0.17 |
| Sample 8 | 14.98 | — | 0.22 | — | 0.20 |
| Sample 9 | 14.44 | 1.37 | 0.12 | 1.58 | 0.23 |
| Sample 10 | 13.60 | 1.76 | 0.18 | 1.92 | 0.31 |

[1]The $Si/Al_2$ ratios disclosed are those of the calcined and ion-exchanged zeolites. Silica, alumina, sodium and potassium content were analysed by inductively coupled plasma optical emission spectrometry (ICP-OES) analysis.
N/A means the alkali metal was not present in the sample, while a dash means that data were not obtained.

As shown in Table 1, ion-exchange reduced the potassium and sodium cation content of Samples 6, 9 and 10 as compared to the as-prepared samples. All of Samples 4 to 10 had a low sodium and potassium content after ion-exchange. Removal of framework alkali metals is important for catalyst activation as residual alkali metals may block zeolite pores and compromise catalytic activity. Removal of $K^+$ can be more challenging than removal of $Na^+$ because of the larger size of potassium ions. The ion-exchange results confirm that $K^+$ ions can be removed from crystalline materials prepared according to the method of the invention by conventional ion-exchange techniques.

As shown by the results in Table 1, the $Si/Al_2$ ratios of Samples 4-10 are lower than those of Comparative Samples 1, 2a and 2b, indicating an increased aluminum content in the product.

Sample 7 was prepared using MCM-49 seed crystals. As shown in Table 1, a high aluminum content zeolite framework is still obtained using a seed crystal of MCM-49. As shown in Table 1, and by the XRD pattern (discussed below), the presence of MCM-49 seed crystals appears to have little impact on the composition of the resulting crystalline material (compare in particular Sample 7 with Sample 6).

Figure 1B:
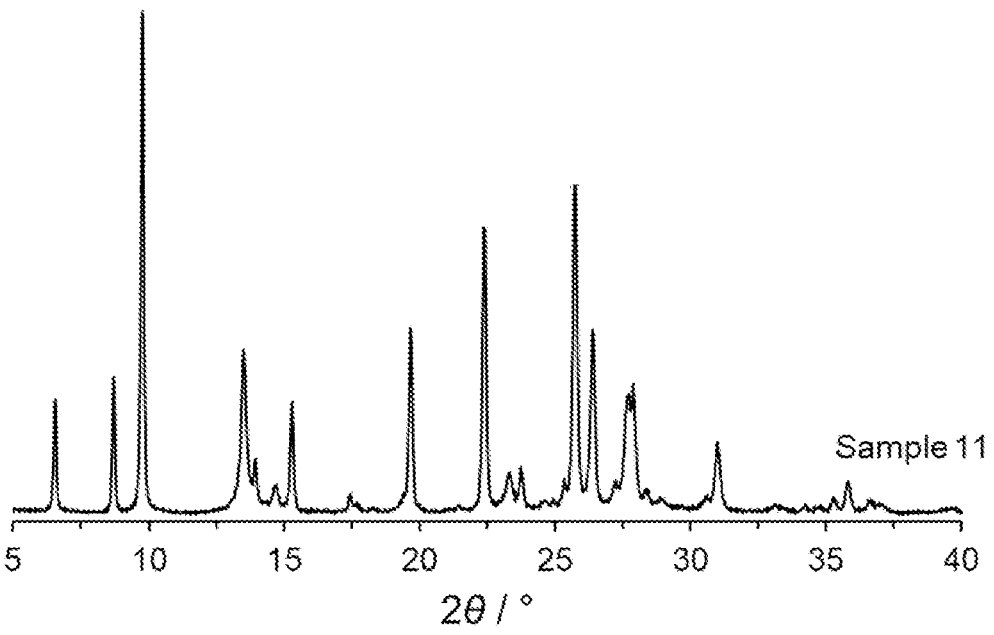
FIG. 1b shows XRD spectra of Comparative Sample 11 of the Examples.

FIG. 1a shows XRD spectra of Comparative Samples 1, 2b, and 3, and Samples 4-10, after ion-exchange and calcination. FIG. 1b shows XRD spectra of Comparative Sample 11, after ion-exchange and calcination. Similarly to the XRD patterns of Comparative Samples 1 and 2b, the XRD patterns of Samples 4-10 show peaks characteristic of MWW framework crystalline materials. As compared to the XRD pattern of Comparative Sample 1 (MCM-49), the XRD pattern of Comparative Sample 2 (MCM-56) shows broader, often merged, peaks. Without wishing to be bound by theory, it is believed that these differences are indicative of the predominance of disordered lamellae in MCM-56, as compared to the more regularly stacked layers present in MCM-49. Most notably, the XRD pattern of MCM-49 materials show two separate peaks clearly identifiable at around 8 and 10 ($2\theta$), while that of MCM-56 shows a broad merged peak in the same region (as is shown by comparison of the XRD spectra for Comparative Samples 1 and 2b). For a more detailed discussion of characteristic XRD patterns of MCM-56 as compared to, e.g., MCM-49, see U.S. Pat. Nos. 5,362,697, 5,827,491, and 5,453,554, the contents of which are incorporated herein by reference. In the diffraction patterns of Samples 4-10, the intensity and sharpness of those peaks at around 8 and 10 ($2\theta$) varies In the XRD patterns of all of Samples 4-10, the peaks at around 8 and 10 ($2\theta$) are less well resolved than in MCM-49 (by comparison to Comparative Sample 1). Without wishing to be bound by theory, it is believed that through a combination of increased aluminum content of the crystalline product and the presence of $K^+$ ions in the reaction mixture increases lamellar disorder during crystallization. More particularly, it is believed that substitution of silicon for aluminum in the zeolite framework increases disorder and disrupts layer packing, while the larger size of $K^+$ ions (as compared to $Na^+$ ions) may increase layer separation during crystallization when alkali metal cations become trapped in the growing zeolite structure.

The XRD pattern for Comparative Sample 11 is believed to be indicative of formation of mordenite. Comparison between Comparative Sample 1 and Comparative Sample 11 suggests that simply increasing the aluminum content of the synthesis mixture, without adjustment of crystallization temperature or duration, results in formation of unwanted mordenite, rather than an MWW zeolite with a higher aluminum content.

FIGS. 2a-2g show Scanning Electron Microscopy (SEM) images of each of Comparative Samples 1-3, Samples 4-10, and Comparative Sample 11. The SEM images show a consistent morphology in the portion of each sample studied, apart from Comparative Sample 3. Variations in morphology, for example resulting from the presence of impurities and/or an amorphous, are not visible in the SEM images of any samples except Comparative Sample 3. Thus, for all samples except Comparative Sample 3, SEM analysis suggests the formation of a single zeolite structure.

Figure 2A:
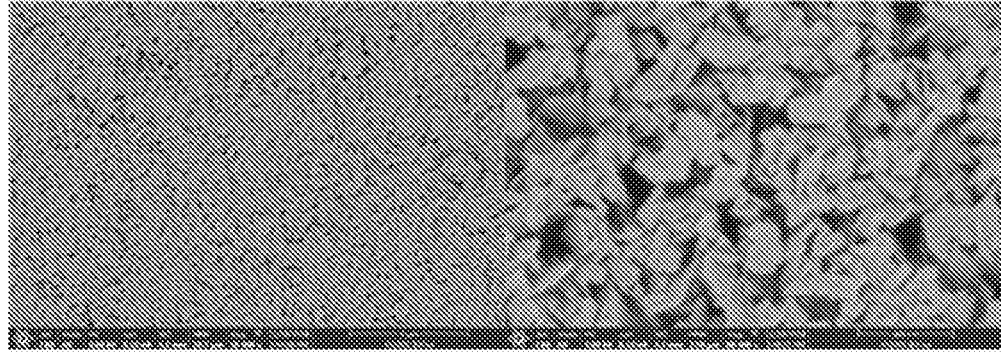
FIGS. 2a-2g show Scanning Electron Microscopy (SEM) images of each of Comparative Samples 1-3, Samples 4-10, and Comparative Sample 11, of the Examples.
Figure 2B:
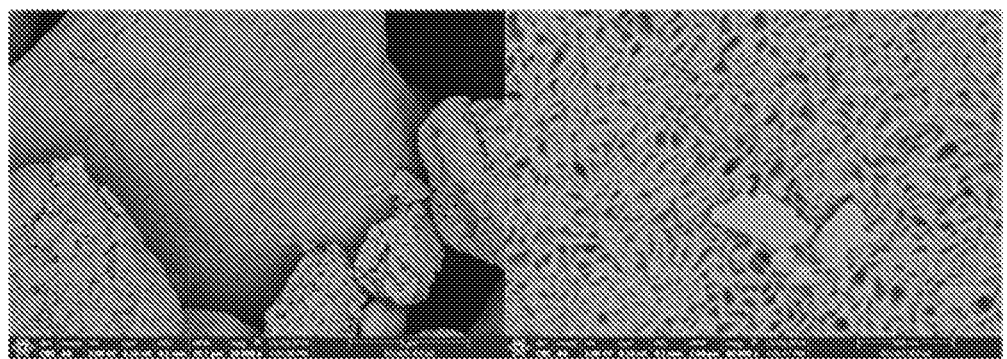
Figure 2B:
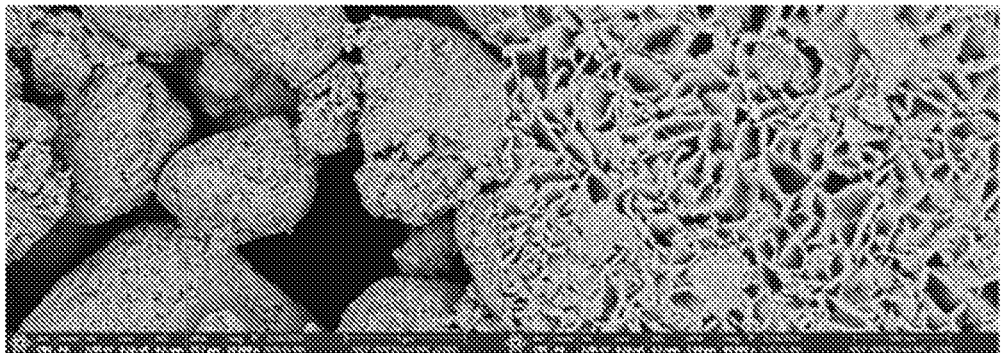
Figure 2C:
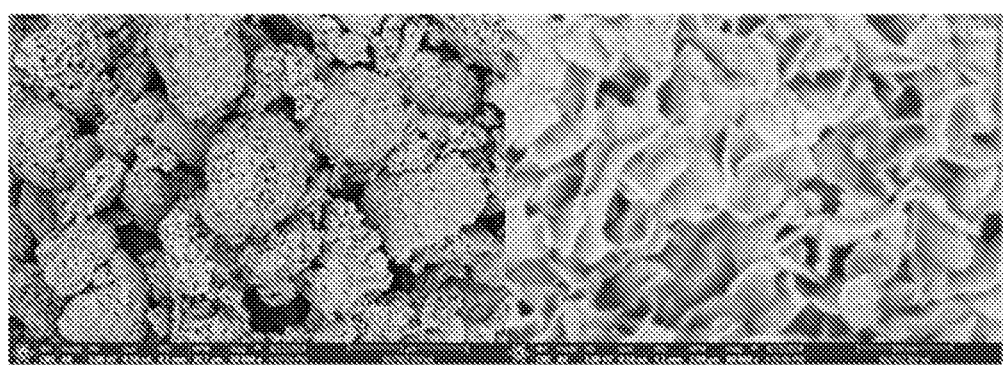
Figure 2C:
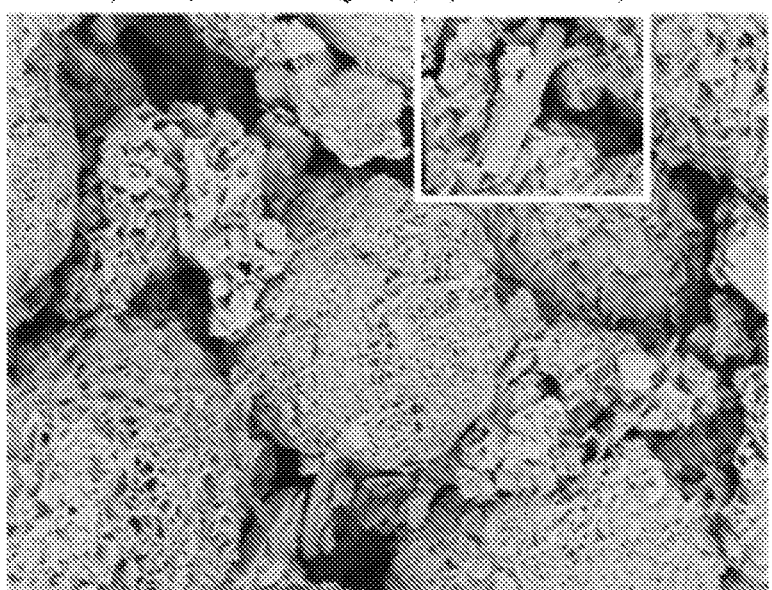
Figure 2D:
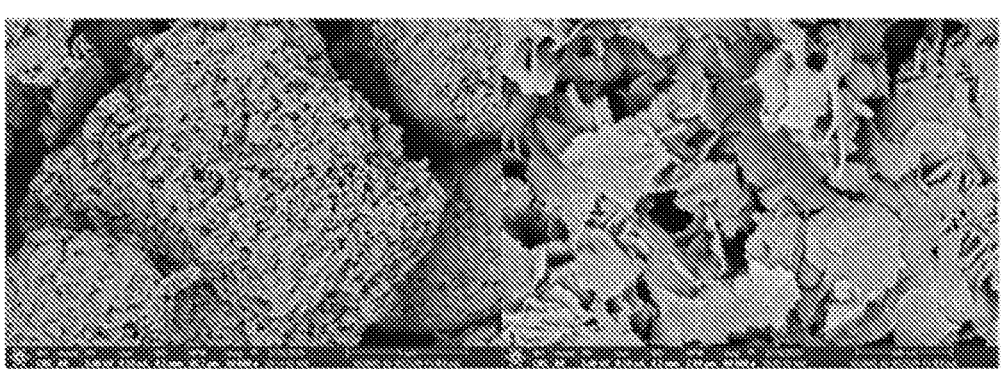
Figure 2D:
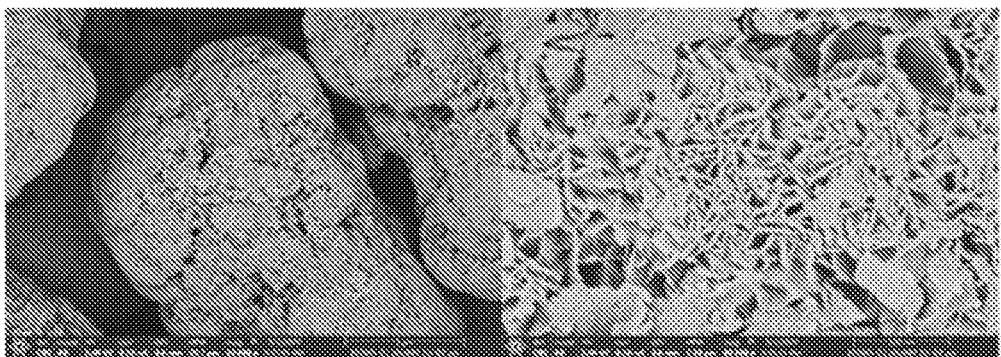
Figure 2E:
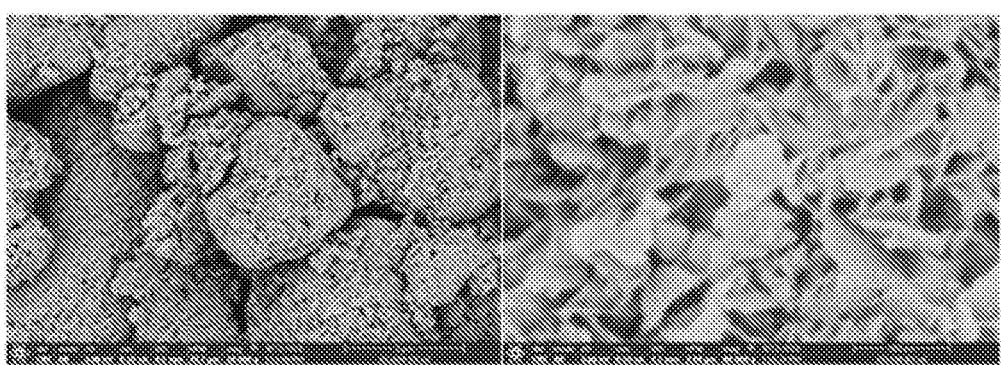
Figure 2E:
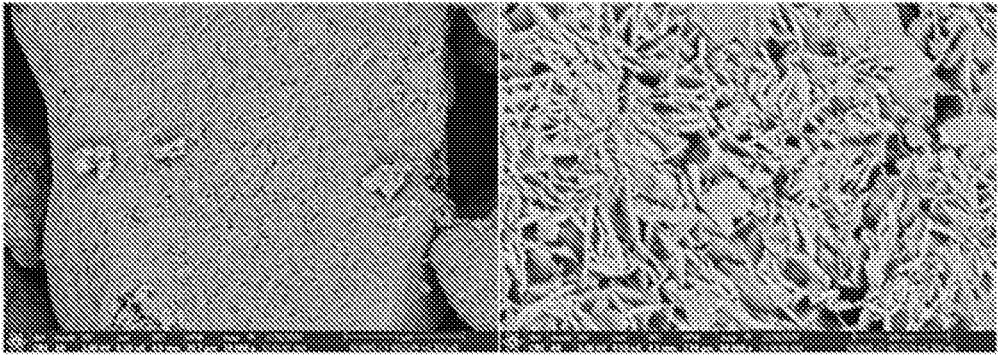
Figure 2F:
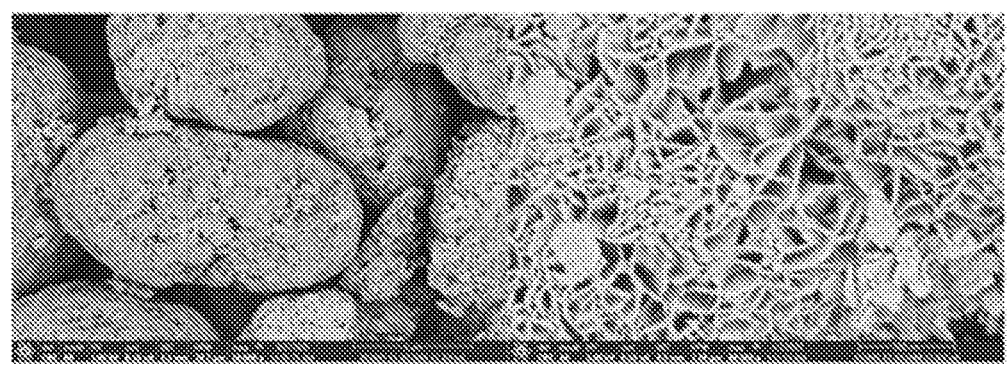
Figure 2F:
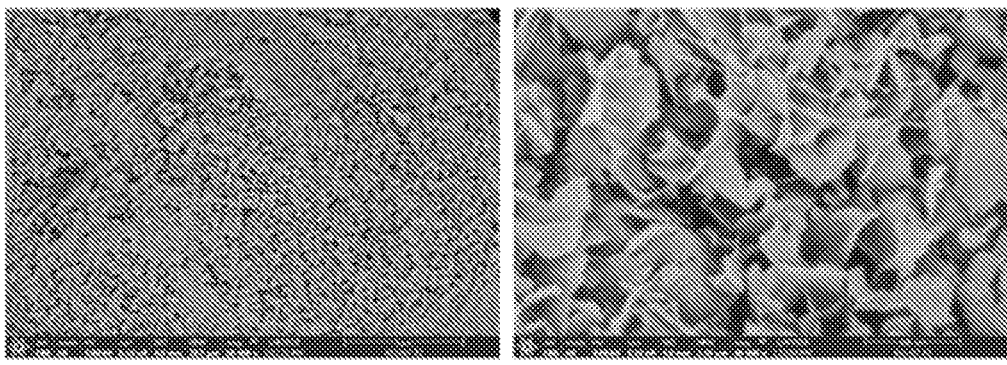
Figure 2G:
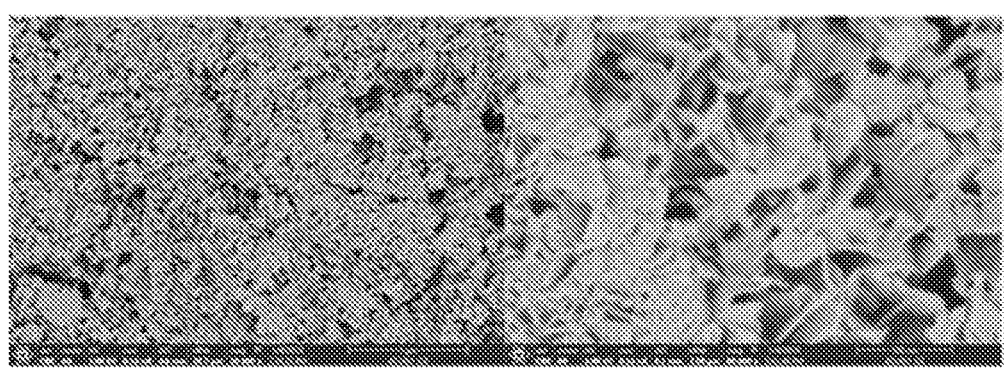
Figure 2G:
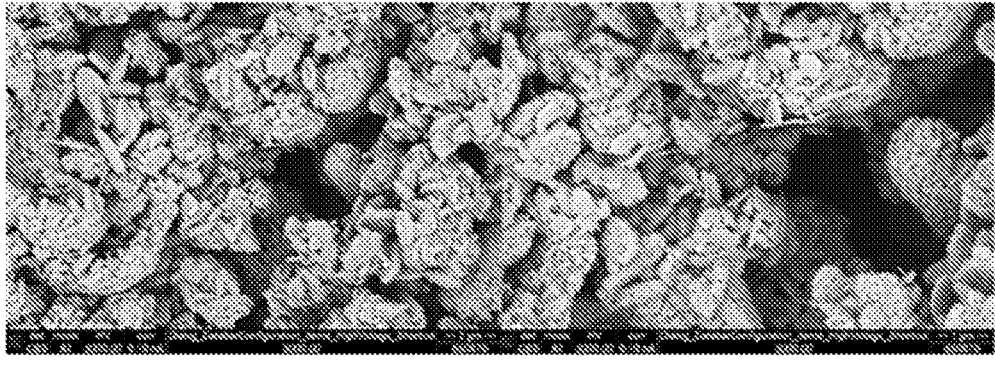

FIG. 2c shows SEM images of Comparative Sample 3. In the expanded view in FIG. 2c, a rod-shaped structure (shown in the white box in the top right corner) is visible. Without wishing to be bound by theory, it is believe that the presence of an impurity with a rod-shaped morphology is indicative of contamination by mordenite. As explained above, Comparative Sample 11 confirms that mordenite can form under crystallization conditions similar to those employed in the preparation of Comparative Sample 3. No such rod-shaped features were detected in SEM images of Samples 4-10, suggesting that the presence of $K^+$ in the synthesis mixture increased reliability in formation of MWW crystalline material.

Figure 3:
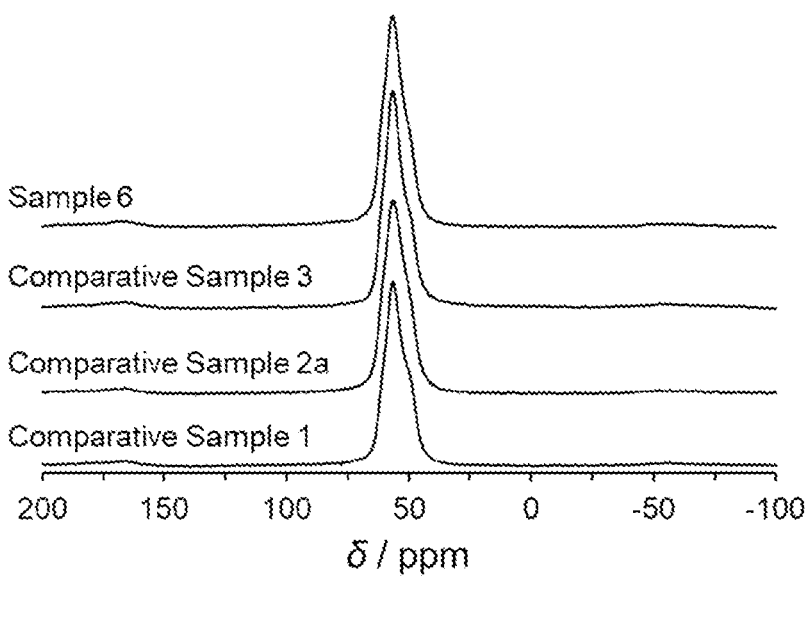
FIG. 3 shows 27 Å1 NMR spectra of Comparative Samples 1, 2a, and 3, and Sample 6, of the Examples.

FIG. 3 shows $^{27}$Al NMR spectra of Comparative Samples 1, 2a, and 3, and Sample 6. In all spectra, a substantial peak is observed at around 50 ppm. A chemical shift ($\delta$) close to 50 ppm is characteristic of Al incorporated into a zeolite framework. None of the spectra show a peak in the region of about 0 ppm, which would be indicative of extra-framework Al. Thus, $^{27}$Al NMR spectroscopy analysis suggests that the Al detected by ICP-OES analysis is framework Al, indicating that the inventive method has successfully incorporated a high proportion of Al into the zeolite framework.

Table 2 shows textural and chemical properties (total surface area, mesopore surface area, and micropore volume) of Comparative Samples 1-3, and Samples 4-10, after ion-exchange and calcination.

TABLE 2

Textural and chemical properties of samples after ion-exchange and calcination.

| Sample | [a]$S_{BET}$ ($m^2\,g^{-1}$) | [b]$S_{ext}$ ($m^2\,g^{-1}$) | $S_{ext}/S_{BET}$ (%) | [c]$V_{micro}$ ($cm^3\,g^{-1}$) |
|---|---|---|---|---|
| Comparative Sample 1 | 508 | 102 | 20 | 0.17 |
| Comparative Sample 2a | 416 | 172 | 41 | 0.11 |
| Comparative Sample 2b | 384 | 123 | 32 | 0.13 |
| Comparative Sample 3 | 460 | 112 | 24 | 0.14 |
| Sample 4 | 413 | 105 | 26 | 0.13 |
| Sample 5 | 429 | 120 | 28 | 0.13 |
| Sample 6 | 449 | 126 | 28 | 0.14 |
| Sample 7 | 457 | 131 | 29 | 0.14 |
| Sample 8 | 365 | 127 | 35 | 0.10 |
| Sample 9 | 393 | 117 | 30 | 0.12 |
| Sample 10 | 294 | 95 | 32 | 0.09 |

[a]BET surface area;
[b]Mesopore surface area obtained from the t-plot applied to the $N_2$ isotherm;
[c]Micropore volume obtained from the t-plot, as referenced in "Analytical Methods in Fine Particle Technology, P. A. Webb and C. Orr, Micrometrics Instrument Corporation ISBN 0-9656783-0-X".

As indicated by the results in Table 2, Samples 4-10 each have a ratio of mesopore surface area to total surface area (expressed as $S_{ext}/S_{BET}$/%) higher than that of MCM-49, comparable to that of MCM-56. While not wishing to be bound by theory, it is believed that mesoporosity increases with increasing separation between, and/or disorder of, the layered structure of the zeolite, while microporosity may decrease if degradation of the layered structure reduces the amount of material having a 10-ring internal pore system. Consequently, MCM-49, with its relatively well-ordered layered structure has been found to exhibit a higher microporosity, and a lower mesoporosity, than the more disordered MCM-56. In the case of Samples 4-10, it is believed that the higher $S_{ext}/S_{BET}$ as compared to MCM-49 reflects increased lamella disorder in zeolites prepared according to the invention. It is believed that increased lamellar disorder increases the proportion of accessible 12-ring surface pores, thus increasing the proportion of total surface area made up by mesopores (in other words, increasing the degree of mesoporosity relative to microporosity). It is expected that an increased degree of mesoporosity relative to microporosity may allow catalysts based on zeolites prepared according to the method of the invention to be useful in catalytic reactions with larger reactants.

Further, samples 4-10, which were prepared with potassium cations in the synthesis mixture, all exhibited a higher $S_{ext}/S_{BET}$, than Comparative Sample 3, which was prepared in the absence of potassium cations. That finding suggests that the presence of potassium cations in the synthesis mixture, together with a high proportion of incorporation of aluminum into the zeolite framework, promotes greater mesoporosity.

In summary, an increased aluminum and the presence of potassium cations in the synthesis mixture is accompanied by changes in surface area and pore volume. In general, the presence of potassium cations as well as additional aluminum in the synthesis mixture provides a zeolite with a layered structure intermediate between those of MCM-49 and MCM-56. Furthermore, it appears that the presence of potassium cations in the synthesis mixture also helps to supress formation of impurities (such as mordenite believed to be present in Comparative Sample 3).

Figure 4:
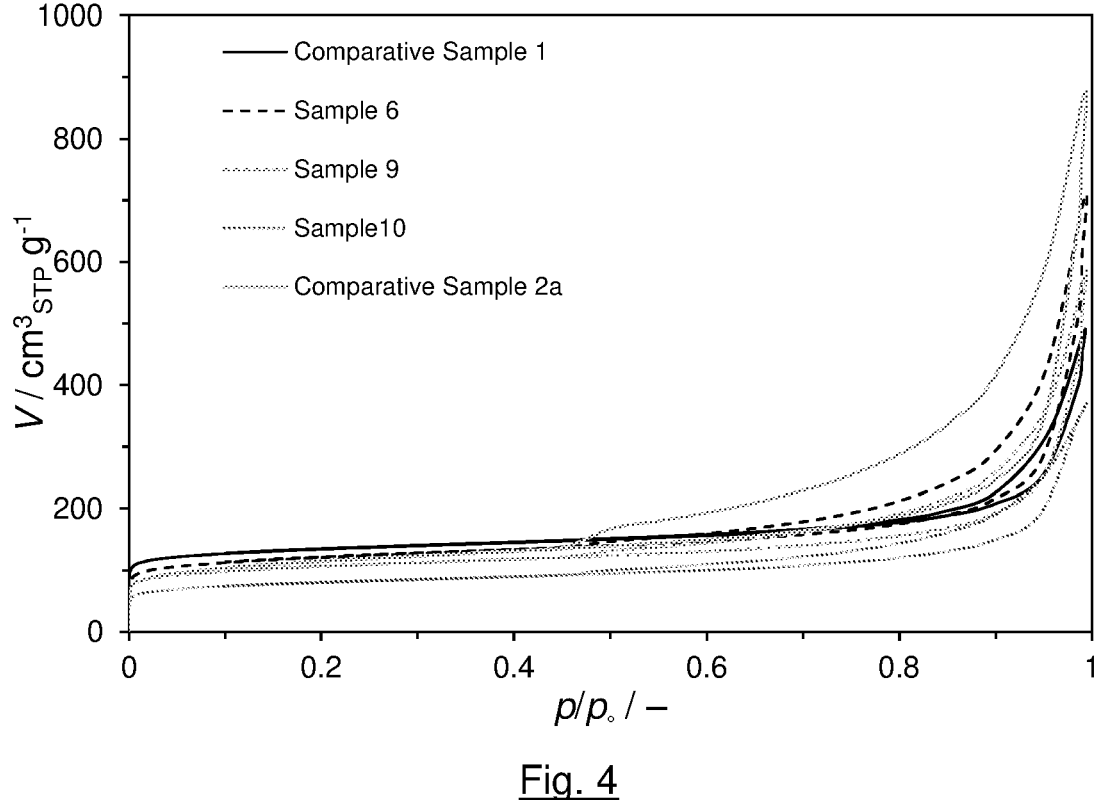
FIG. 4 shows $N_2$ physisorption isotherms of Comparative Samples 1 and 2a, and Samples 6, 9 and 10, of the Examples.

FIG. 4 shows $N_2$ physisorption isotherms of Comparative Samples 1 and 2a, and Samples 6, 9 and 10, after calcination and ion exchange. Physisorption isotherms were collected according to the method disclosed in "Analytical Methods in Fine Particle Technology", P. A. Webb and C. Orr, Micrometrics Instrument Corporation ISBN 0-9656783-0-X, the contents of which are incorporated herein by reference.

The physisorption isotherm for Comparative Sample 1 (MCM-49) differs from that for Comparative Sample 2a (MCM-56) in that the isotherm for MCM-56 shows a strong hysteresis loop, which re-joins the initial curve at about 4.8 $p/p^0$. It is believed that the large, pronounced hysteresis loop of MCM-56, which is indicative of significantly delayed desorption of $N_2$ from the zeolite as $p/p^0$ is reduced back from 1 to 0, is evidence for MCM-56 having a different mesopore shape to that of MCM-49. As can be seen from FIG. 4, $N_2$ physisorption isotherms of Samples 6, 9 and 10 are more similar to that of Comparative Sample 1 (MCM-49), at least in that the isotherms of Samples 6, 9 and 10 have less pronounced hysteresis loops. Nevertheless, hysteresis loops are visible in the isotherms of Samples 6, 9 and 10, most prominently in the isotherm of Sample 10. The results presented in FIG. 4 are another indication of the zeolites of Samples 6, 9 and 10 having physical properties intermediate those of MCM-49 and MCM-56.

Figure 5:
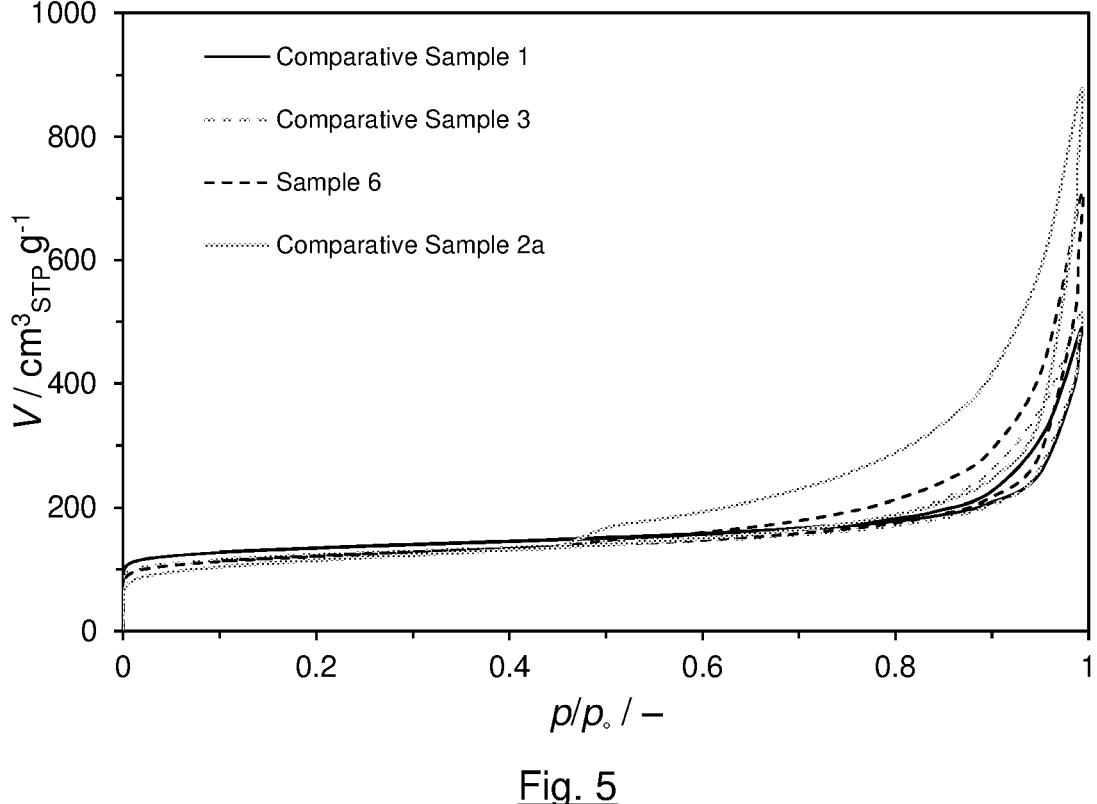
FIG. 5 compares $N_2$ physisorption isotherms of Comparative Sample 3 and Sample 6 with those of Comparative Samples 1 and 2a, of the Examples.

FIG. 5 compares $N_2$ physisorption isotherms of Comparative Sample 3 and Sample 6 with those of Comparative Samples 1 and 2a, and indicates that Comparative Sample 3 and Sample 6 exhibit physical properties intermediate those of MCM-49 and MCM-56. While the isotherm of Comparative Sample 3 features a hysteresis loop more pronounced than that of Comparative Sample 1, the isotherm of Sample 6 has an even more pronounced hysteresis loop, closest to the hysteresis loop in the isotherm of Comparative Example 2a. Consequently, it is believed that the mesopore shape of the zeolite of Sample 6 is more similar to that of MCM-56 than is the mesopore shape of Comparative Example 3. While not wishing to be bound by theory, it is believed that these results evidence that increasing aluminum content in the zeolite framework has an effect on mesopore shape, which may be enhanced by the presence of $K^+$ in the synthesis mixture.

Table 3 shows the density of Comparative Samples 1 and 2 and Sample 6 in their as-synthesised and dried form.

TABLE 3

Density of samples in their as-synthesized and dried form.

| Sample | Density (g/cm³) |
| --- | --- |
| Comparative Sample 1 (MCM-49) | 2.002 |
| Comparative Sample 2 (MCM-56) | 1.901 |
| Sample 6 (MWW-type) | 2.146 |

As shown by the results in Table 3, the density of Sample 6 (MWW-type) is significantly higher than the density of Comparative Sample 1 (MCM-49) and Comparative Sample 2 (MCM-56). This is especially advantageous as it allows for a higher mass of zeolite material that can be packed into a fixed catalyst bed volume once formulated.

Analysis of Formulated Extrudates

Portions of Comparative Samples 1 and 3, and Sample 6, were formed into 1120th inch quadrulobe extrudates according to the following method. These extrudates correspond to Comparative Samples 11 and 12, and Sample 13. Eighty (80) parts by weight of zeolite (respectively of Comparative Samples 1 and 3 and Sample 6) were combined with 20 parts Veral-300 alumina, on a dry weight basis, to form a dry powder. The dry powder was placed in a miller or a mixer and mixed for about 5 to 15 minutes. Sufficient water was added to the powder during the mixing process to produce an extrudable paste. The extrudable paste was formed into a $\frac{1}{20}^{th}$ inch quadrulobe extrudate using a ram extruder. After extrusion, the $\frac{1}{20}^{th}$ inch quadrulobe extrudate was dried at a temperature ranging from 121° C. to 168° C. The dried extrudate was then calcined in nitrogen to a temperature between 454° C. and 593° C. and cooled under nitrogen flow. The extrudates were then charged to an exchange column, humidified, and exchanged with ammonium nitrate. After washing the extrudates with water, they were calcined under a flow of air between 454° C. and 593° C. The dried extrudates were then tested for collidine uptake according to the following method. The collidine uptake of the extrudate zeolite compositions was determined as the micromoles of collidine (a type of catalyst poison) absorbed per gram of composition sample that is dried under nitrogen flow at 200° C. for 60 minutes on a Thermogravametric Analyzer. After drying the catalyst sample, the collidine was sparged over the catalyst sample for 60 minutes at a collidine partial pressure of 3 torr. The sample was then flushed with nitrogen for 60 minutes. The collidine uptake was calculated from the following formula: (sample weight after sparging with collidine−dried catalyst sample weight)÷(molecular weight of collidine X dried catalyst sample weight). When the sample weight and the dried sample weight is measured in grams, the molecular weight of collidine is $121.2\times10^{-4}$ grams per micromole.

Table 4 shows measured collidine uptake of the extrudates of Comparative Samples 11, 12 and Sample 13. Collidine (2,4,6-trimethylpyridine) is a relatively large molecule having an aromatic ring core, and so uptake of collidine can provide an indication of the proportion of acid sites located in mesopores accessible to larger molecules. It is believed that catalysts that exhibit high collidine uptake are likely to be effective in alkylation of larger molecules, especially single-ring aromatic molecules. Having a larger number of surface acid sites accessible to larger molecules may allow the catalyst to continue to provide an acceptable level of activity for a longer period of time.

TABLE 4

Collidine uptake of the samples in the form of quadrulobe extrudates.

| Sample | $N_{collidine}$ (μmol g⁻¹) |
| --- | --- |
| Comparative Sample 11 (based on MCM-49 of Sample 1) | 108.5 |
| Comparative Sample 12 (based on MWW-type of Sample 3) | 118 |
| Sample 13 (based on MWW-type of Sample 6) | 135.7 |

As shown by the results in Table 4, while collidine uptake appears to increase with increasing aluminum in the zeolite synthesis mixture (demonstrated by Comparative Sample 12), collidine uptake increases further when potassium cations are also included in the zeolite synthesis mixture (demonstrated by Sample 13). The collidine uptake results support the surface area and pore volume tests that suggest that the presence of potassium cations in the synthesis mixture favours formation of a zeolite structure having a greater mesoporosity than found for MCM-49 materials.

While the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

Additionally or alternately, the invention relates to:

Embodiment 1: A method of synthesizing a molecular sieve of MWW framework type, the method comprising the steps of:

a) preparing a synthesis mixture capable of forming a molecular sieve of MWW framework type, said synthesis mixture comprising water, a silicon source, a source of a trivalent element X, a potassium cation source, a structure directing agent R, a source of another alkali metal cation M, optionally a source of a pentavalent element Z, optionally a source of hydroxide ions, and optionally seed crystals, the synthesis mixture having the following molar ratio composition:

Si:$X_2$=8 to 18
$H_2$O:Si=5 to 100
(M+$K^+$):Si=0.1 to 0.5
M:$K^+$=1 to 10
R:Si=0.1 to 1;

b) heating said synthesis mixture under crystallization conditions for a time sufficient to form crystals of said molecular sieve of MWW framework type, said crystallization conditions including a temperature of from 100° C. to 220° C.; and c) recovering said crystals of the molecular sieve of MWW framework type from the synthesis mixture.

Embodiment 2: The method of embodiment 1, wherein the potassium source comprises potassium hydroxide, potassium aluminate, potassium silicate, a potassium salt such as KCl or KBr or potassium nitrate, or a combination thereof, preferably potassium hydroxide.

Embodiment 3: The method of any preceding embodiment, wherein the synthesis mixture has a molar ratio (M+$K^+$):Si=0.15 to 0.25.

Embodiment 4: The method of any preceding embodiment, wherein the synthesis mixture has a molar ratio $K^+$:Si=0.01 to 0.1.

Embodiment 5: The method of any preceding embodiment, wherein the structure directing agent R is selected from the group consisting of cyclopentylamine, cyclohexylamine, cycloheptylamine, hexamethyleneimine (HMI), heptamethyleneimine, homopiperazine, pentamethonium bromide or hydroxide, hexamethonium bromide or hydroxide, heptamethonium bromide or hydroxide, and combinations thereof, preferably wherein the structure directing agent R is hexamethyleneimine (HMI).

Embodiment 6: The method of any preceding embodiment, wherein X is selected from the group consisting of aluminum, boron, gallium, and mixtures thereof, preferably wherein X comprises at least aluminum, more preferably wherein X is aluminum.

Embodiment 7: The method of any preceding embodiment, wherein the source of a trivalent element X comprises $Al_2O_3$, preferably wherein the source of a trivalent element X is $Al_2O_3$.

Embodiment 8: The method of any preceding embodiment, wherein the silicon source comprises $SiO_2$, preferably wherein the silicon source is $SiO_2$.

Embodiment 9: The method of any preceding embodiment, wherein Z, if present, is phosphorus; preferably wherein the synthesis mixture does not contain any pentavalent element Z.

Embodiment 10: The method of any preceding embodiment, wherein the synthesis mixture has a molar ratio M:$K^+$=2 to 8, wherein M is sodium, lithium and/or rubidium, preferably sodium.

Embodiment 11: The method of any preceding embodiment, wherein the synthesis mixture comprises the alkali metal cation M source in a molar ratio of M:Si of from 0.1 to 0.25.

Embodiment 12 The method of any preceding embodiment, wherein the $OH^-$ source, if present, is an alkali metal hydroxide, preferably KOH, NaOH or a combination thereof, optionally wherein the synthesis mixture comprises a source of hydroxide ions in a $OH^-$/Si molar ratio of from 0.1 to 0.5, optionally 0.15 to 0.25.

Embodiment 13: The method of any preceding embodiment, wherein the synthesis mixture comprises seed crystals in an amount of from 0.05 to 2 $g_{seed}$/$g_{(silicon\ source+source\ of\ trivalent\ element\ X)}$, optionally wherein the seed crystals comprise a molecular sieve of framework type MWW.

Embodiment 14: The method of any preceding embodiment, wherein the crystallization conditions in step (b) include a temperature of from 100° C. to 200° C., preferably from 140° C. to 160° C.

Embodiment 15: The method of any preceding embodiment, wherein the crystallization conditions in step (b) include heating for a period of from 1 to 800 hours, especially from 10 to less than 600 hours, in particular from 24 to 140 hours, for example from 60 to 90 hours.

Embodiment 16: The method of any preceding embodiment, wherein the recovered crystals of molecular sieve of MWW framework type has a Si/$X_2$ molar ratio of from 8 to 16, preferably 10 to 16, more preferably 12 to 16, most preferably 14 to 15.

Embodiment 17: A molecular sieve of MWW framework type obtainable by the method of any one of embodiments 1-19, optionally wherein the molecular sieve has, in its calcined and anhydrous form, a composition with a Si/$X_2$ molar ratio of from 8 to 18, preferably 10 to 18, more preferably 12 to 18, most preferably 12 to 16, optionally 14 to 15, optionally wherein X is Al.

Embodiment 18: The molecular sieve of embodiment 17, having, in its as-synthesized and dried form, a density, as measured by a pycnometer (i.e. density of powder material), higher than 2.0 g/cm$^3$, preferably of at least 2.10 g/cm$^3$.

Embodiment 19: Use of the molecular sieve of embodiment 17 or 18 in a hydrocarbon chemical conversion process, in particular wherein the hydrocarbon chemical conversion process is alkylation reaction, more particularly aromatic alkylation.

The invention claimed is:

1. A method of synthesizing a molecular sieve of MWW framework type, the method comprising the steps of:

a) preparing a synthesis mixture capable of forming a molecular sieve of MWW framework type, said synthesis mixture comprising water, a silicon source, a source of a trivalent element X, a potassium cation source, a structure directing agent R, a source of another alkali metal cation M, optionally a source of a pentavalent element Z, optionally a source of hydroxide ions, and optionally seed crystals, the synthesis mixture having the following molar ratio composition:

$Si:X_2=8$ to 18
$H_2O:Si=5$ to 100
$(M+K^+):Si=0.1$ to 0.5
$M:K^+=1$ to 10
$R:Si=0.1$ to 1;

b) heating said synthesis mixture under crystallization conditions for a time sufficient to form crystals of said molecular sieve of MWW framework type, said crystallization conditions including a temperature of from 100° C. to 220° C.; and c) recovering said crystals of the molecular sieve of MWW framework type from the synthesis mixture.

2. The method according to claim 1, wherein the potassium source comprises potassium hydroxide, potassium aluminate, potassium silicate, a potassium salt such as KCl or KBr or potassium nitrate, or a combination thereof.

3. The method according to claim 1, wherein the synthesis mixture has a molar ratio $(M+K^+):Si=0.15$ to 0.25.

4. The method according to claim 1, wherein the synthesis mixture has a molar ratio $K^+:Si=0.01$ to 0.1.

5. The method according to claim 1, wherein the structure directing agent R is selected from the group consisting of cyclopentylamine, cyclohexylamine, cycloheptylamine, hexamethyleneimine (HMI), heptamethyleneimine, homopiperazine, pentamethonium bromide or hydroxide, hexamethonium bromide or hydroxide, heptamethonium bromide or hydroxide, and combinations thereof.

6. The method according to claim 1, wherein X is selected from the group consisting of aluminum, boron, gallium, and mixtures thereof.

7. The method according to claim 1, wherein the source of a trivalent element X comprises $Al_2O_3$.

8. The method according to claim 1, wherein the silicon source comprises $SiO_2$.

9. The method according to claim 1, wherein the synthesis mixture has a molar ratio $M:K^+=2$ to 8, wherein M is sodium, lithium and/or rubidium.

10. The method according to claim 1, wherein the synthesis mixture comprises the alkali metal cation M source in a molar ratio of M:Si of from 0.1 to 0.25.

11. The method according to claim 1, wherein the synthesis mixture comprises a source of hydroxide ions, wherein the OH source is an alkali metal hydroxide.

12. The method according to claim 1, wherein the synthesis mixture comprises seed crystals in an amount of from 0.05 to 2 $g_{seed}$/g (silicon source+source of trivalent element X).

13. The method according to claim 1, wherein the crystallization conditions in step (b) include a temperature of from 100° C. to 200° C.

14. The method according to claim 1, wherein the crystallization conditions in step (b) include heating for a period of from 1 to 800 hours.

15. The method according to claim 1, wherein the recovered crystals of molecular sieve of MWW framework type has a $Si/X_2$ molar ratio of from 8 to 16.

16. A molecular sieve of MWW framework type obtainable by the method of claim 1.

17. The molecular sieve of claim 16, having, in its as-synthesized and dried form, a density, as measured by a pycnometer, higher than 2.0 $g/cm^3$.

18. The method according to claim 1, further comprising forming the molecular sieve and using the molecular sieve in a hydrocarbon chemical conversion process.

19. The method according to claim 1, wherein X is aluminum.

20. The method according to claim 1, wherein the synthesis mixture does not contain any pentavalent element Z.

21. The method according to claim 1, wherein the synthesis mixture comprises a source of hydroxide ions in a OH/Si molar ratio of from 0.1 to 0.5.

22. The method according to claim 12, wherein the seed crystals comprise a molecular sieve of framework type MWW.

23. The molecular sieve of claim 16, wherein the molecular sieve has, in its calcined and anhydrous form, a composition with a $Si/X_2$ molar ratio of from 8 to 18.

24. The method of claim 18, wherein the hydrocarbon chemical conversion process is aromatic alkylation.

* * * * *